United States Patent
Lyman, Jr. et al.

(10) Patent No.: US 11,181,154 B2
(45) Date of Patent: Nov. 23, 2021

(54) CONTROL SYSTEMS FOR HYDRAULIC AXIAL DISPLACEMENT MACHINES

(71) Applicant: EATON INTELLIGENT POWER LIMITED, Dublin (IE)

(72) Inventors: Richard Randel Lyman, Jr., Chaska, MN (US); Anil Balasaheb Kharpas, Chikhali (IN); Avinash Dadaso Patil, Hadapsar (IN); Sanjay Dhondappa Mali, Kharadi (IN); Matthew Edward Creswick, Shakopee, MN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/639,999

(22) PCT Filed: Aug. 16, 2018

(86) PCT No.: PCT/US2018/000157
§ 371 (c)(1),
(2) Date: Feb. 18, 2020

(87) PCT Pub. No.: WO2019/035891
PCT Pub. Date: Feb. 21, 2019

(65) Prior Publication Data
US 2020/0256404 A1  Aug. 13, 2020

(30) Foreign Application Priority Data
Aug. 18, 2017  (IN) .............................. 201711029390

(51) Int. Cl.
*F16D 31/02* (2006.01)
*F04B 49/12* (2006.01)
(Continued)

(52) U.S. Cl.
CPC ............ *F16D 31/02* (2013.01); *F04B 49/123* (2013.01); *F16H 61/423* (2013.01); *F16H 61/433* (2013.01)

(58) Field of Classification Search
CPC .... F16H 61/433; F16H 61/423; F04B 49/123; F04B 49/002; F16D 31/02
See application file for complete search history.

(56) References Cited

U.S. PATENT DOCUMENTS 3,429,225 A    2/1969  Keyworth
4,543,787 A *  10/1985 Eckhardt ............... F16H 61/472
                                                         60/444
(Continued)

FOREIGN PATENT DOCUMENTS

EP      0087773 A1    9/1983
JP    2004-150308 A   5/2004
(Continued)

OTHER PUBLICATIONS

Series 42 Axial Piston Pumps, Technical Information, Sauer Danfoss, 69 pages (Jun. 2010).

(Continued)

*Primary Examiner* — Abiy Teka
(74) *Attorney, Agent, or Firm* — Merchant & Gould P.C.

(57) ABSTRACT

Control systems and feedback assemblies for hydraulic axial displacement machines, such as pumps and motors. The control systems and feedback assemblies can reduce friction on the charging spools and provide for a more reliable return of the swashplate to a neutral position. Aspects of the control systems and feedback assemblies can be modularized for, e.g., easy maintenance and to reduce the overall size of the system.

24 Claims, 19 Drawing Sheets

(51) Int. Cl.
*F16H 61/423* (2010.01)
*F16H 61/433* (2010.01)

(56) References Cited

U.S. PATENT DOCUMENTS

| | | | |
|---|---|---|---|
| 7,121,188 | B2 | 10/2006 | Thoms et al. |
| 7,171,887 | B2 | 2/2007 | Lilia |
| 2009/0224192 | A1* | 9/2009 | Oikawa ............... F16K 11/0716 251/129.15 |

FOREIGN PATENT DOCUMENTS

| | | |
|---|---|---|
| JP | 2008-075556 A | 4/2008 |
| JP | 2009-243435 A | 10/2009 |
| JP | 2018-150870 A | 9/2018 |
| KR | 10-2004-0067269 A | 7/2004 |
| KR | 10-2012-0060441 A | 6/2012 |

OTHER PUBLICATIONS

Axial Piston Closed Circuit Pumps, Series 42, Service Manual, Danfoss, 76 pages (Jul. 2015).
Improve your time to market with greater design flexibility, MP1 Closed Circuit Axial Piston Pumps, Danfoss, 12 pages (Mar. 2016).
H1 Axial Piston Pumps, Single and Tandem, Product Line Overview, Danfoss, 8 pages (Apr. 2017).
H1 Axial Piston Pump 115/130 147/165, ISL Integrated Speed Limitation, Technical Information, Danfoss, 32 pages (Mar. 2018).
Series 42 Closed Circuit Axial Piston Pumps, Technical Information, Danfoss, 80 pages (Aug. 2018).
MP1 Axial Piston Pumps, 28/32 cm3, 38/45 cm3, Data Sheet, Danfoss, 2 pages (Jan. 2019).
MP1 Axial Piston Pumps, Size 28/32, 38/45, Technical Information, Danfoss, 98 pages (Jan. 2020).
Axial Piston Variable Pump AA10VG, Data Sheet, Rexroth Bosch Group, 44 pages (Jun. 2009).
Axial Piston Variable Pump A10VG Series 10, Instruction Manual, Rexroth Bosch Group, 64 pages (Jun. 2018).
Axial Piston Variable Pump A10VG Series 10, Rexroth Bosch, 60 pages (Dec. 2019).
Axial Piston Variable Pump A10VG Series 10, Operating Instructions, Rexroth Bosch Group, 60 pages (Feb. 2010).
International Search Report and Written Opinion of the International Searching Authority for International Patent Application No. PCT/US2018/000157 dated Dec. 13, 2018, 14 pages.
U.S. Appl. No. 16/776,172, filed Jan. 29, 2020, 27 pages.
Supplementary European Search Report dated May 27, 2021 in EP Patent Application No. 18846281.6-1004, 5 pages.

* cited by examiner

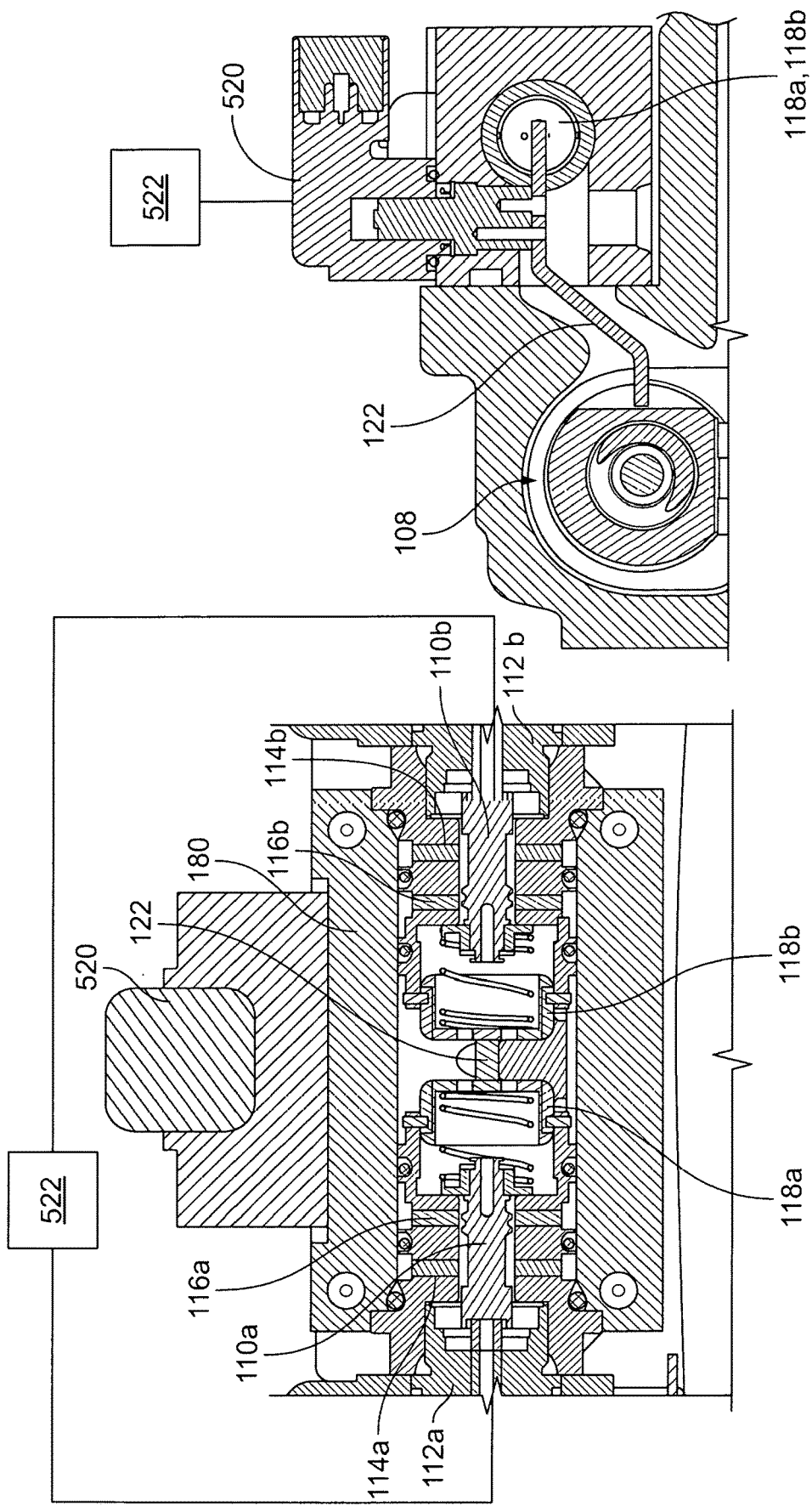

CONTROL SYSTEMS FOR HYDRAULIC AXIAL DISPLACEMENT MACHINES

CROSS-REFERENCE TO RELATED APPLICATION

This application is a National Stage of PCT/US2018/000157, filed on Aug. 16, 2018, which claims the benefit of Indian Patent Application No. 201711029390, filed on Aug. 18, 2017, the disclosures of which are incorporated herein by reference in their entireties. To the extent appropriate, a claim of priority is made to each of the above disclosed applications.

BACKGROUND

In some examples of hydraulic axial displacement machines, such as a pumps and motors, the machine is operated by providing an input command signal (e.g., an electrical or hydraulic signal) from a controlling unit that provides hydraulic pressure to move one or more servo-pistons along their movement axis. In some examples, movement of the servo-piston(s) is transmitted to a swashplate, causing the angle of the swashplate to change. The angular position of the swashplate dictates the volumetric displacement generated by the axial displacement machine. When the swashplate is in a neutral position, i.e., perpendicular to a movement axis of the servo-piston, volumetric displacement goes to zero. The greater the obliqueness of the angular position of the swashplate relative to the movement axis of the servo-piston, the greater is the volumetric displacement.

Typically, a feedback system provides information regarding the position of the swashplate at a given point in time to help regulate the machine and adjust the angular position of the swashplate such that the volumetric displacement (i.e., the angular position of the swashplate) is consistent with the input control signal.

There is a need for improved control and feedback systems for controlling hydraulic axial displacement machines.

SUMMARY

In general terms the present disclosure is directed to control systems for hydraulic axial displacement machines.

According to certain aspects of the present disclosure, the control systems include a feedback assembly that provides feedback information that is proportional to a swashplate position relative to a neutral position.

According to certain aspects of the present disclosure, the feedback information provided by the feedback assembly is proportional to a drive command signal, the drive command signal being, e.g., electrical or hydraulic.

According to certain aspects of the present disclosure, a control system includes forward motion and reverse motions modules, the forward motion module being adapted to provide swashplate position information when the machine is driving a forward fluid flow, and the reverse motion module being adapted to provide swashplate position information when the machine is driving a reverse fluid flow.

According to certain aspects of the present disclosure, a control system for a hydraulic axial displacement machine includes a feedback assembly, the feedback assembly including a spool, a spool actuator, a pivotal feedback arm, a feedback piston, and a feedback spring, the spool being coupled to the feedback spring and adapted to move axially with the feedback spring between a charging position and a neutral position, a first portion of the feedback arm being pivotally coupled to a servo-piston and adapted to pivot proportionally to an angular position of a swashplate, a second portion of the feedback arm being coupled to the feedback piston, the feedback spring being adapted to bias the spool towards the neutral position of the spool.

In some examples, the feedback springs of the present disclosure are compound springs that include, e.g., an inner spring and an outer spring.

In some examples, a drive command signal is transmitted to the spool, the spool being adapted to respond to the drive command signal by moving axially to the charging position against a restoring force of the feedback spring, and such that an input pressure line is in communication with a charging line causing fluid to flow into a servo-piston chamber and thereby charge the servo-piston.

In some examples, the control system includes a spool actuator adapted to move the spool to the charging position. In some examples, the spool actuator includes a solenoid adapted to receive electrical drive command signals.

In some examples, the drive command signal is transmitted to the spool in the form of a pressure increase in a pilot pressure line that axially moves the spool to the charging position.

In some examples, the control system includes a forward motion module and a reverse motion module for the hydraulic axial displacement machine, each of the forward and reverse motion modules including: a spool movable between a charging position and a neutral position relative to one of a first and a second servo-piston charging line and one of a first and a second fluid input line; a spool actuator; and a feedback piston having a spring coupled to the spool, the feedback piston being coupled to the feedback arm such that pivoting of the feedback arm in a first direction away from the neutral position activates the feedback piston of the forward motion module and generates a spring compression force between the spool and the feedback piston of the forward motion module, and such that pivoting of the feedback arm in a second direction away from the neutral position activates the feedback piston of the reverse motion module and generates a spring compression force between the spool and the feedback piston of the reverse motion module, wherein each of the compression forces is proportional to a position of a swashplate relative to a neutral position.

In some examples the forward motion module feedback piston and the reverse motion module feedback piston are axially aligned. In some examples, the forward motion module feedback piston and the reverse motion module feedback piston are axially parallel but not aligned.

In some examples, the feedback arm includes a primary arm pivotally coupled to the servo-piston and a secondary arm pivotally coupled to the primary arm and to a feedback piston or two feedback pistons of both a forward motion module and a reverse motion module.

In some examples, the control system includes, for each of the feedback pistons, an axial movement stopper, such as one or more pins, that engages the piston in the neutral position and prevents the feedback piston from moving beyond the neutral position under the return force of the feedback piston spring.

In some examples, the feedback assembly of the control system includes an angle sensor adapted to detect an amount of pivoting of the feedback arm away from the neutral position. The detected amount of pivot of the feedback arm is transmitted as a feedback signal to a controller which compares the detected pivot to a drive command signal. In some examples, the controller is adapted to transmit an error signal to the spool actuator in response to a discrepancy between the drive command signal and the feedback signal, the error signal causing the spool to move to compensate for the discrepancy.

According to still further aspects of the present disclosure, a control system for a hydraulic axial displacement machine includes a forward motion module and a reverse motion module, each of the forward and reverse motion modules including: a spool movable between a charging position and a neutral position relative to one of a first and a second charging line and one of a first and a second fluid input line; a spool actuator; and a spring coupled to the spool such that axial movement towards the charging position of the forward motion module spool generates a compression force between the forward motion module spool and the forward motion module spring that biases the spool towards the neutral position, and such that axial movement towards the charging position of the reverse motion module spool generates a compression force between the reverse motion module spool and the reverse motion module spring that biases the spool towards the neutral position.

Features of the present disclosure can provide for improved control of hydraulic axial displacement machines. For example, the feedback piston spring coupled to the spool means that a manual control or a manifold block is not needed to reset the spool to the neutral position when desired to do so, which can also result in a more compact design and a more reliable return to, and stabilization in, the neutral position.

In addition, hysteresis can be reduced in that, in some examples, unlike prior art mechanisms, there is no direct mechanical contact between the spool and the feedback arm (rather, the spool and the feedback arm communicate via the spring loaded feedback piston), reducing load forces from the feedback arm that can generate friction on the spool. By reducing this friction the tendency of the spool to "stick" in a given position is reduced, reducing hysteresis of the overall hydraulic machine.

Further advantages provided by aspects of the present disclosure include the systems' modularity, e.g., the forward motion module and the reverse motion module, including the separate control components used for forward and reverse motion. These modules can be easily assembled in a desirable compact configuration, and easily disassembled for maintenance, replacement, etc. The spring loaded feedback pistons allow for the modular design, in which forward motion and reverse motion are provided using separate spools, instead of a single spool used for both forward and reverse motion.

With respect to those examples of control systems disclosed herein that include an angle sensor for the feedback arm, the benefit of control redundancy can be provided. For example, in the event of a failure of the angle sensor, the feedback assembly operates independently of the angle sensor using the spring force of the feedback piston to properly balance the charging force such that it corresponds to the drive command signal.

Additional advantages provided by features of the present disclosure include the control modules' compact nature. For example, the configuration of the housing or cage that enables coupling the spool to the spring-loaded feedback piston allows for multiple, relatively small diameter flow paths to be provided through the spool cavity of the housing/cage, thereby permitting the use of, e.g., relatively small spool actuators, such as relatively small solenoids.

Although the control systems and feedback assemblies of the present disclosure will be described in connection with hydraulic axial displacement machines, it should be appreciated that principles disclosed herein may also be applied in other machines.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not necessarily to scale and are intended for use in conjunction with the explanations in the following detailed description.

FIG. 24 is a cross-sectional view of a portion of the control system of FIG. 23.

FIG. 25 is a cross-sectional view of a further portion of the control system of FIG. 23.

DETAILED DESCRIPTION

Figure 1:
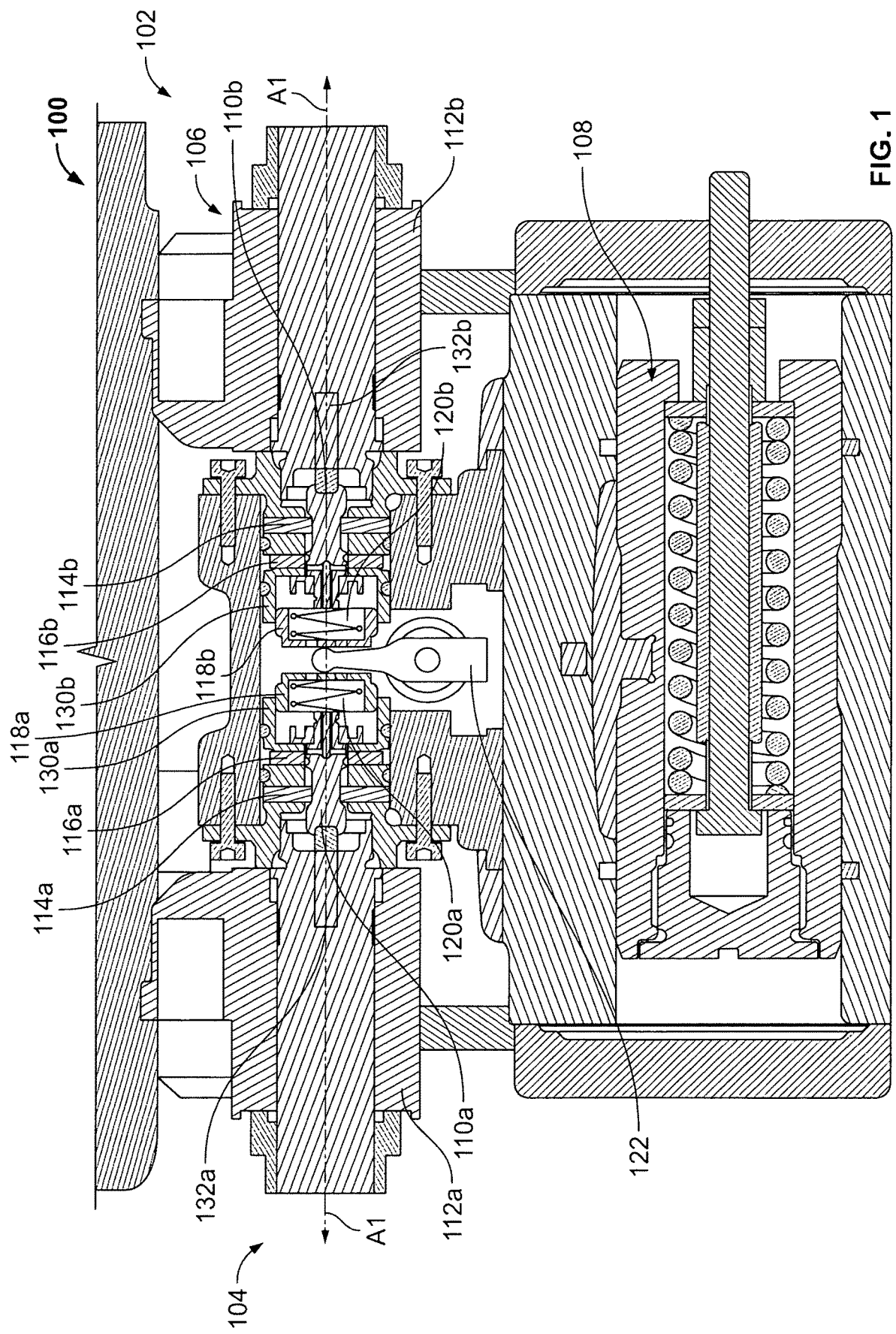
FIG. 1 is a cross-sectional view of an embodiment of a control system coupled to a servo-piston of an example axial displacement machine in accordance with the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring to FIGS. 1-17, a hydraulic axial displacement machine 100 is schematically depicted. In some non-limiting examples the axial displacement machines described herein include hydraulic motors or hydraulic pumps. Such hydraulic axial displacement machines can be utilized in a wide variety of equipment having a hydraulics system or a hydraulics component, and the present disclosure is not limited to any particular type or types of equipment in which the hydraulic axial displacement machines described herein are implemented.

The hydraulic axial displacement machine 100 includes a control system 102. The control system includes a first control module 104 and a second control module 106. In some examples, the first and second control modules are of identical construction and include identical parts. The first control module 104 controls forward motion of a servo-piston 108. The second control module 106 controls reverse motion of the servo-piston 108.

Figure 2:
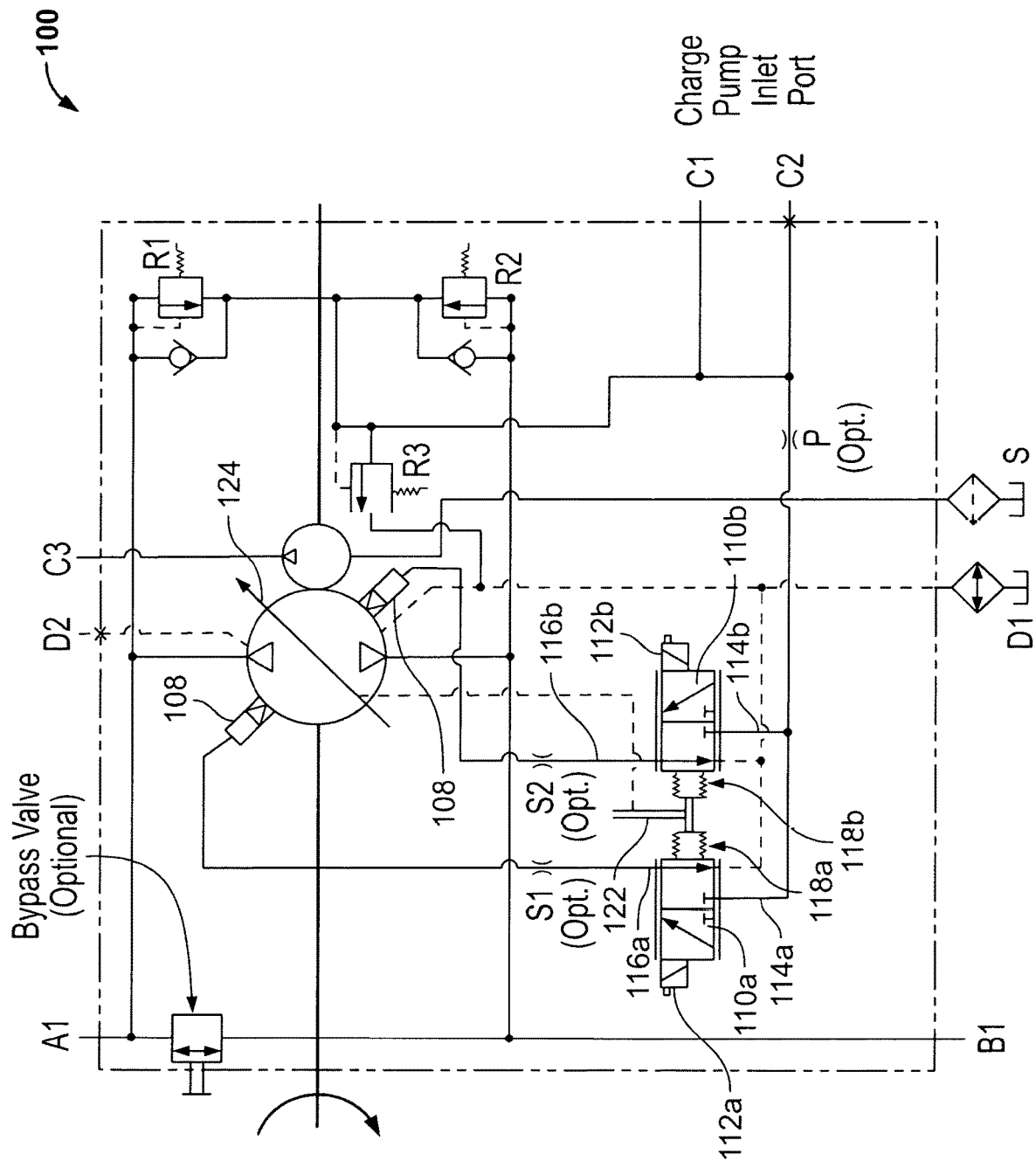
FIG. 2 is a schematic control diagram of the axial displacement machine of FIG. 1.

Each control module 104, 106 includes, respectively, a spool 110a, 110b, a spool actuator 112a, 112b (e.g., a solenoid), an input line 114a, 114b and a charge pressure line 116a, 116b for charging the servo-piston, a feedback piston 118a, 118b, and a feedback piston spring 120a, 120b. Both modules are coupled to the same feedback arm 122. The control module 104 is active during forward motion of the hydraulic machine 100, and the control module 106 is active during reverse motion of the hydraulic machine 100. In this example control system 102, the forward motion module feedback piston 118a and the reverse motion module feedback piston 118b are axially aligned along the central feedback piston axis A1. The feedback pistons 118a, 118b are housed in cages 130a, 130b, respectively of the modules 104, 106. The servo-piston 108 is coupled to a swashplate 124 (FIG. 2).

When neither of the spools 110a, 110b is actuated by its corresponding solenoid 112a, 112b, case pressure in the servo-piston charge lines 116a, 116b in each cage 130a, 130b maintains a swashplate 124 (FIG. 2) in a neutral position. An electrical charging signal is sent to the forward motion solenoid 112a or the reverse motion solenoid 112b, actuating the corresponding spool 110a, 110b and causing the spool to shift axially (along the axis A1) towards its corresponding feedback spring 122a, 122b. The spool shifts axially as a result of a force imparted by a driving pin 132a, 132b of the corresponding solenoid 112a, 112b. The actuated spool 110a, 110b shifts axially proportionally to the charging signal, opening a communication between the pressure input line 114a, 114b and the servo-piston charge line 116a, 116b corresponding to the spool.

The charging pressure in the charge line 116a, 116b, causes the servo-piston to move in one direction corresponding to the actuated spool 110a, 110b, i.e., right or left in FIG. 1, corresponding to forward or reverse motion, respectively, of the machine 100.

Movement of the servo-piston 108 causes the feedback arm 122 to pivot such that the feedback piston 118a, 118b corresponding to the actuated spool shifts in the opposite direction (left or right) against the spring force provided by the corresponding feedback spring 120a, 120b of the feedback piston 118a, 118b. The desired swashplate angle is achieved when the axial force applied to the spool 110a, 110b by the solenoid 112a, 112b balances the axial force applied to the spool 110a, 110b by the corresponding feedback spring 120a, 120b of the corresponding feedback piston 118a, 118b. The generated axial spring force is proportional to the angle of the swashplate 124 relative to its neutral position.

As the charging signal on the solenoid 112a, 112b reduces or goes to zero; the actuating force on the corresponding spool 110a, 110b provided by the solenoid decreases and the force provided by the corresponding feedback spring 120a, 120b of the corresponding feedback piston 118a, 118b pushes the spool 110a, 110b towards, and ultimately to, its neutral position, thereby assisting in returning the spool 110a, 110b and the swashplate 124 to their neutral position. The amount of axial motion of the spool 110a, 110b towards its respective feedback piston 118a, 118b is proportional to the desired angle of the swashplate 124 relative to the neutral position of the swashplate 124.

The feedback arm 122 is not in direct contact with either spool 110a, 110b but rather cooperates with the spool 110a, 110b via the corresponding feedback piston 118a, 118b and feedback spring 120a, 120b. The feedback piston 118a, 118b can provide a seat 140a, 140b, respectively, for one axial end of the corresponding feedback spring 120a, 120b, with the opposing axial end of the feedback spring 120a, 120b abutting a spool-spring coupler 142a, 142b. The spool-spring coupler 142a, 142b transmits axial forces between the corresponding spool 110a, 110b and its corresponding feedback spring 120a, 120b.

Referring to FIGS. 6-10, the cage 130a, 130b, of each control module 104, 106 (FIG. 1) defines a feedback piston cavity 150 that at least partially receives the feedback piston 118a, 118b and the feedback spring 120a, 120b, a spool cavity 152 that at least partially receives the spool 110a, 110b, and an actuator volume that defines a seat 154 for receiving at least a portion of the solenoid 112a, 112b and/or a plug 320a, 320b (FIG. 19) adapted for coupling a pilot pressure line 320a, 320b (FIG. 19) to the cage 130a, 130b.

The spool-spring coupler 142a, 142b can be housed in the feedback piston cavity 150 of the corresponding cage 130a, 130b. The feedback piston cavity 150, the spool cavity 152 and the actuator volume that defines the seat 154 are in axial fluid communication with one another such that the feedback spring 120a, 120b, the spool-spring coupler 142a, 142b, the spool 110a, 110b, and the spool actuator 112a, 112b can operably cooperate with one another along the central axis A.

The cage 130a, 130b includes a body 156 that defines the feedback piston cavity 150, the spool cavity 142 and the seat 154. In addition, the body 156 defines a plurality of flow passages 158 which open to allow fluid flow or partially allow fluid flow, and to close to prevent or substantially prevent fluid flow depending on the axial position of the spool 110a, 110b within the spool cavity 142. Depending on the spool position and the particular flow passages 158 that are open and closed, fluid flow through the flow passages 158 can enable, e.g., charging of the servo-piston 108, drainage to a tank, etc.

Figure 3:
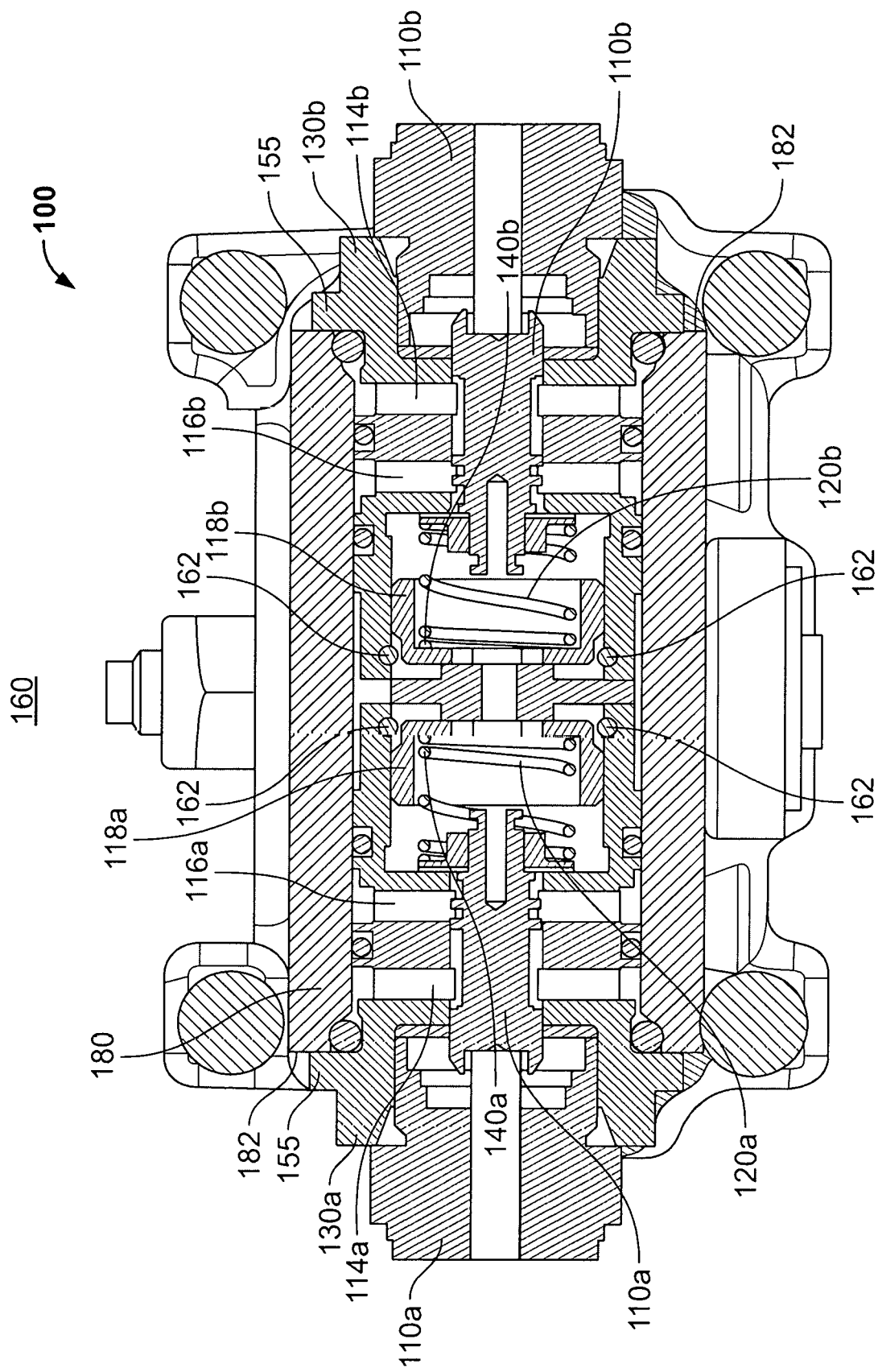
FIG. 3 is a cross-sectional view of a portion of the control system of FIG. 1.
Figure 4:
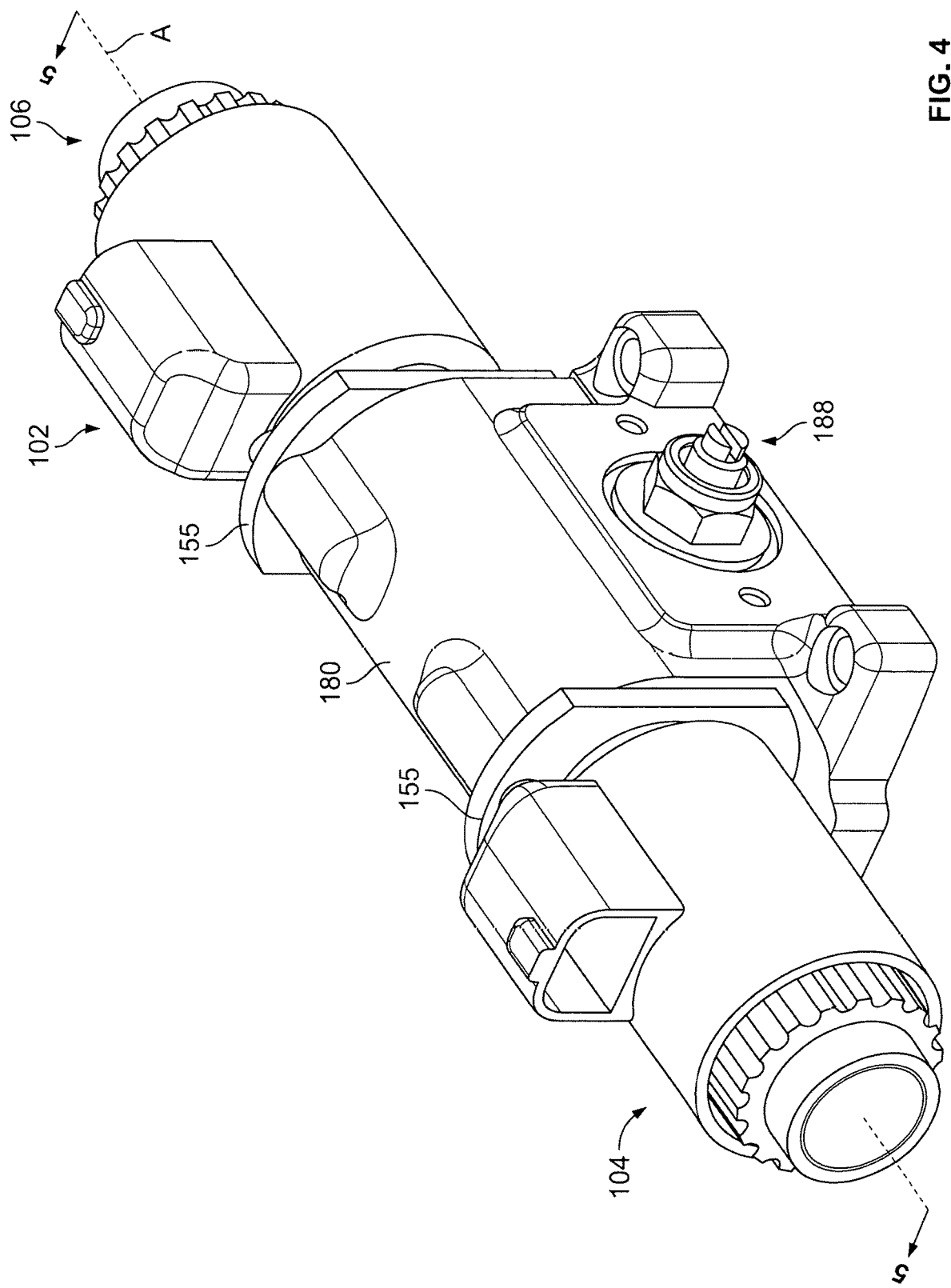
FIG. 4 is a perspective view of a portion of the control system of FIG. 1.
Figure 5:
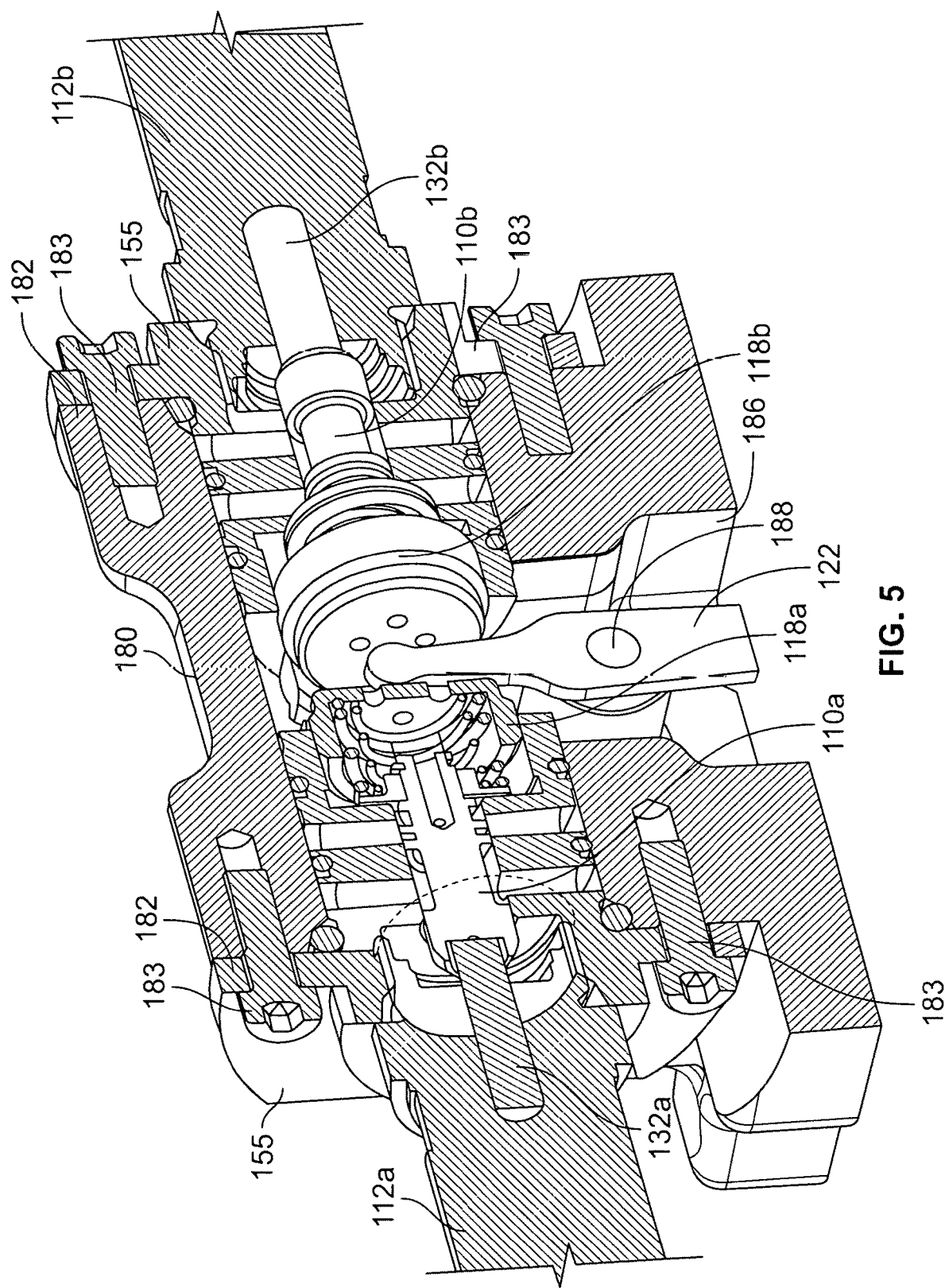
FIG. 5 is a perspective partial axial cross-sectional view of the portion of the control system of FIG. 4 along the line 5-5 in FIG. 4.
Figure 7:
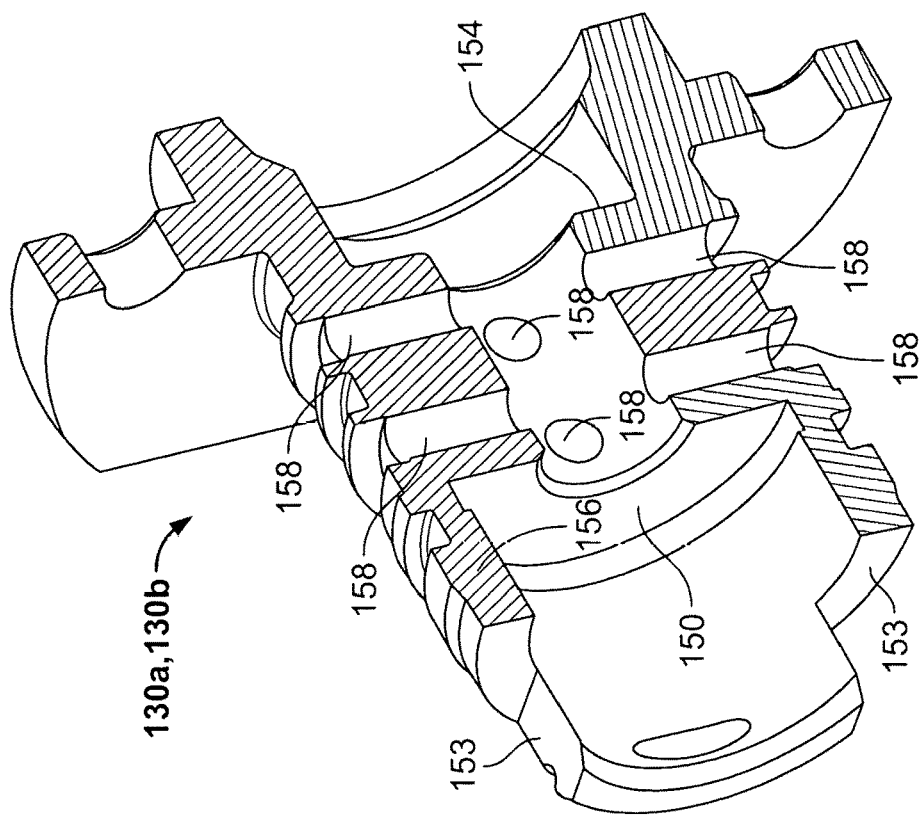
FIG. 7 is a further perspective axial cross-sectional view of the control cage of FIG. 6.
Figure 6:
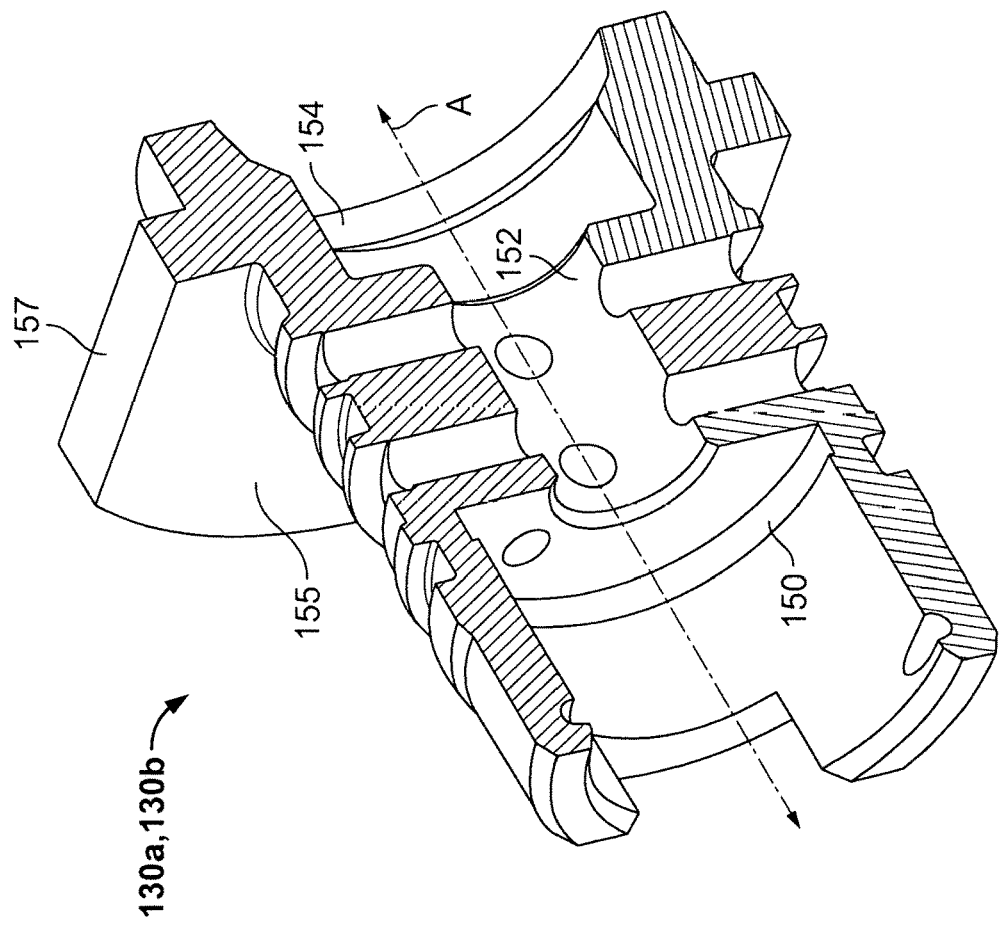
FIG. 6 is a perspective axial cross-sectional view of one of the control cages of the portion of the control system of FIG. 4.
Figure 8:
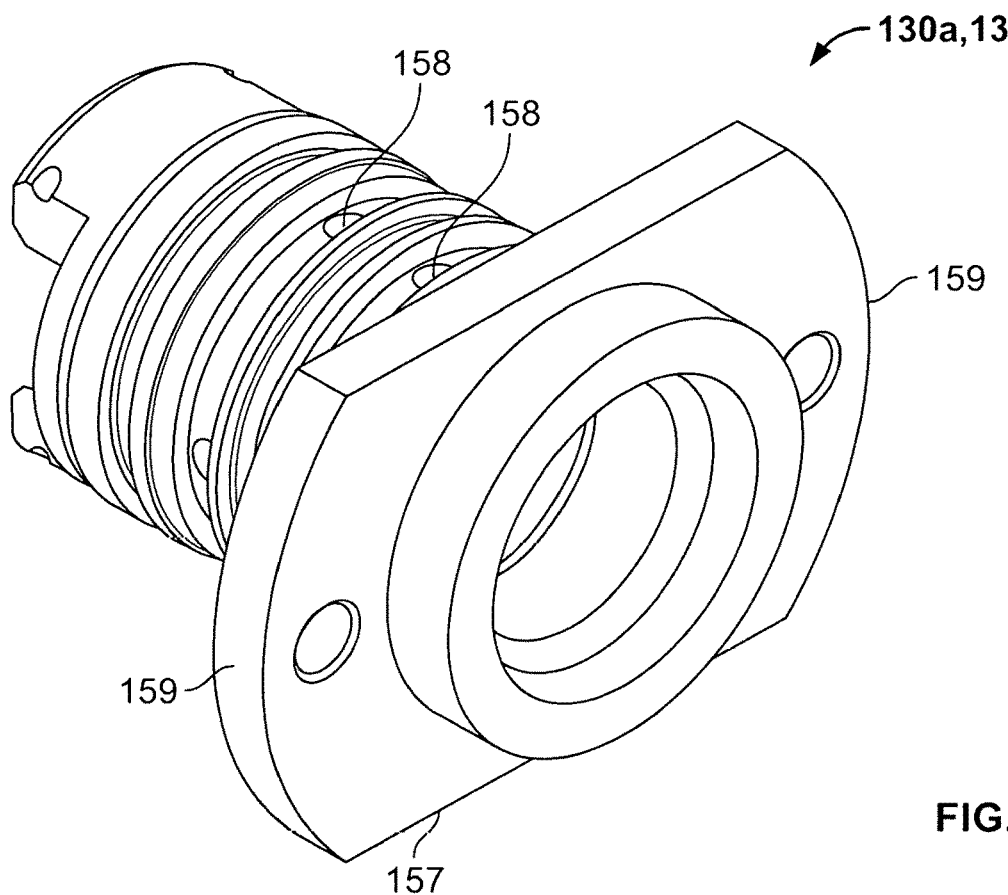
FIG. 8 is a perspective view of the control cage of FIG. 6.
Figure 9:
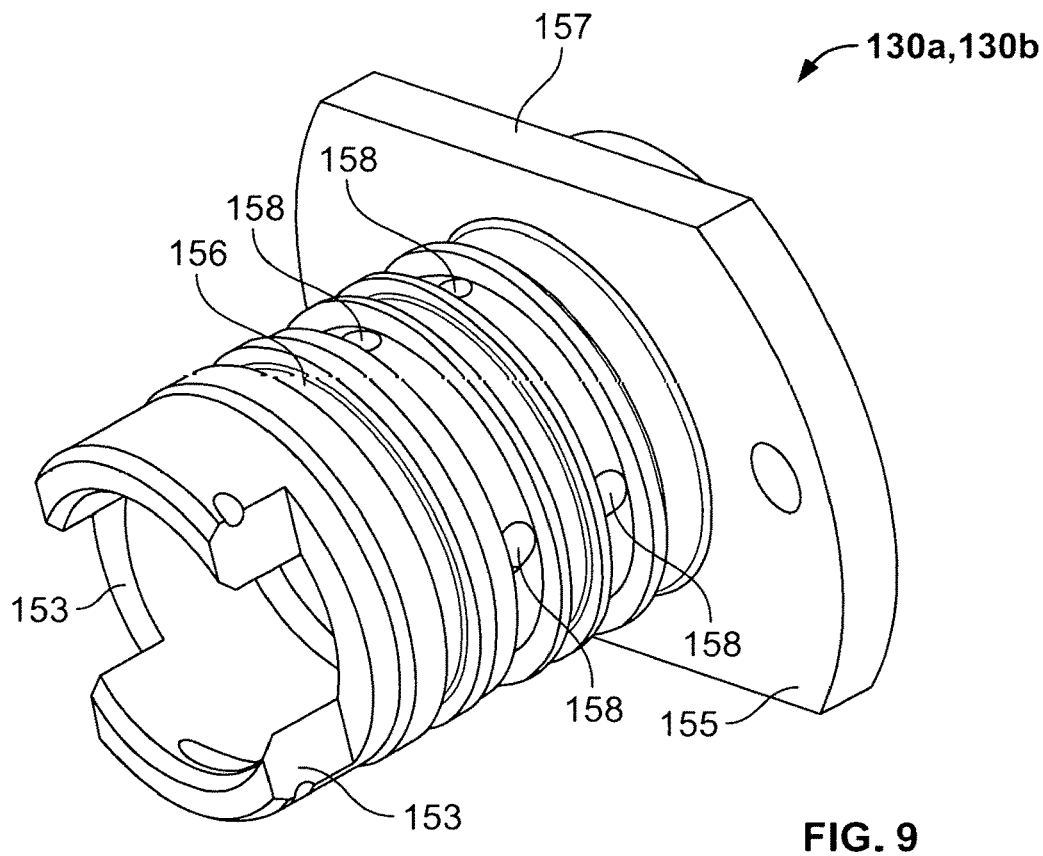
FIG. 9 is a further perspective view of the control cage of FIG. 6.
Figure 10:
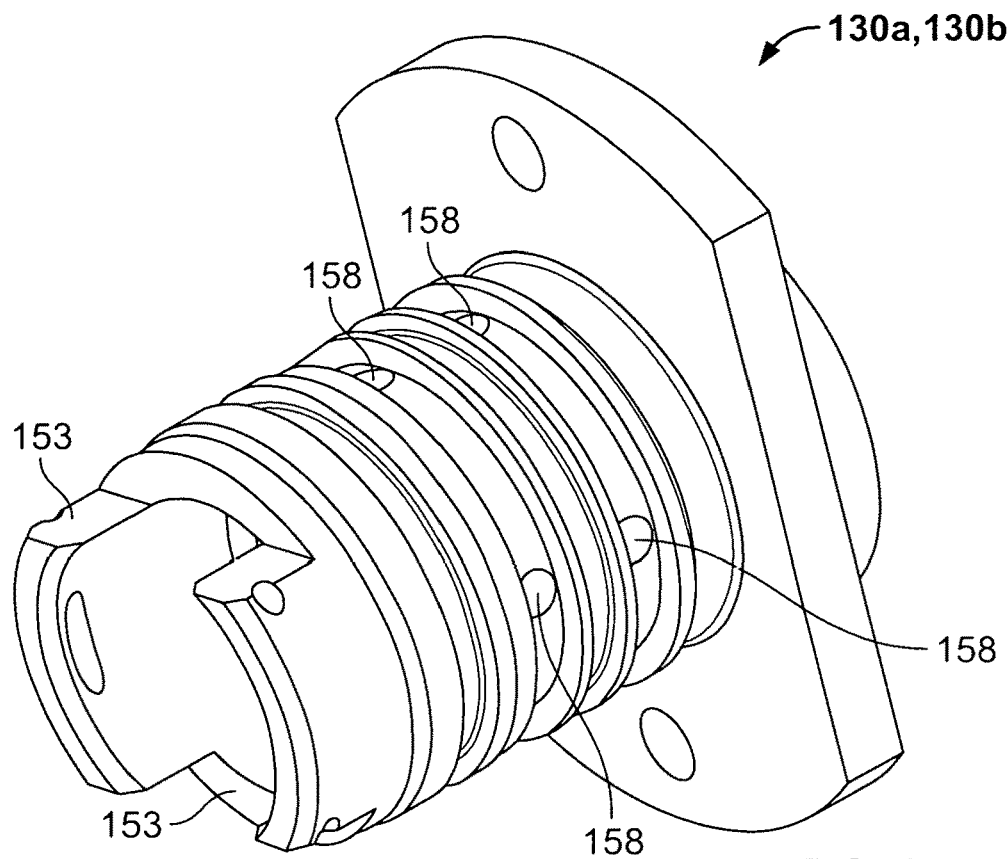
FIG. 10 is a further perspective view of the control cage of FIG. 6.
Figure 11:
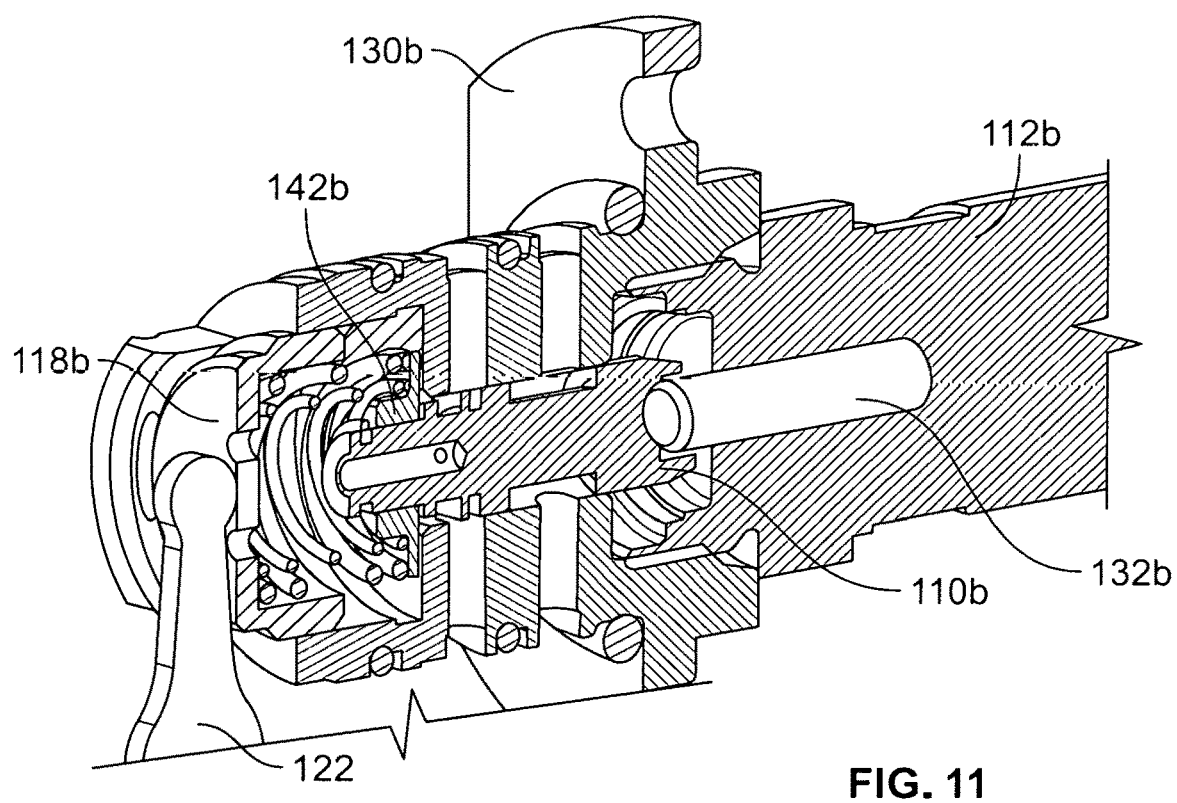
FIG. 11 is a perspective axial cross-sectional view of one of the control modules of the control system of FIG. 1.
Figure 12:
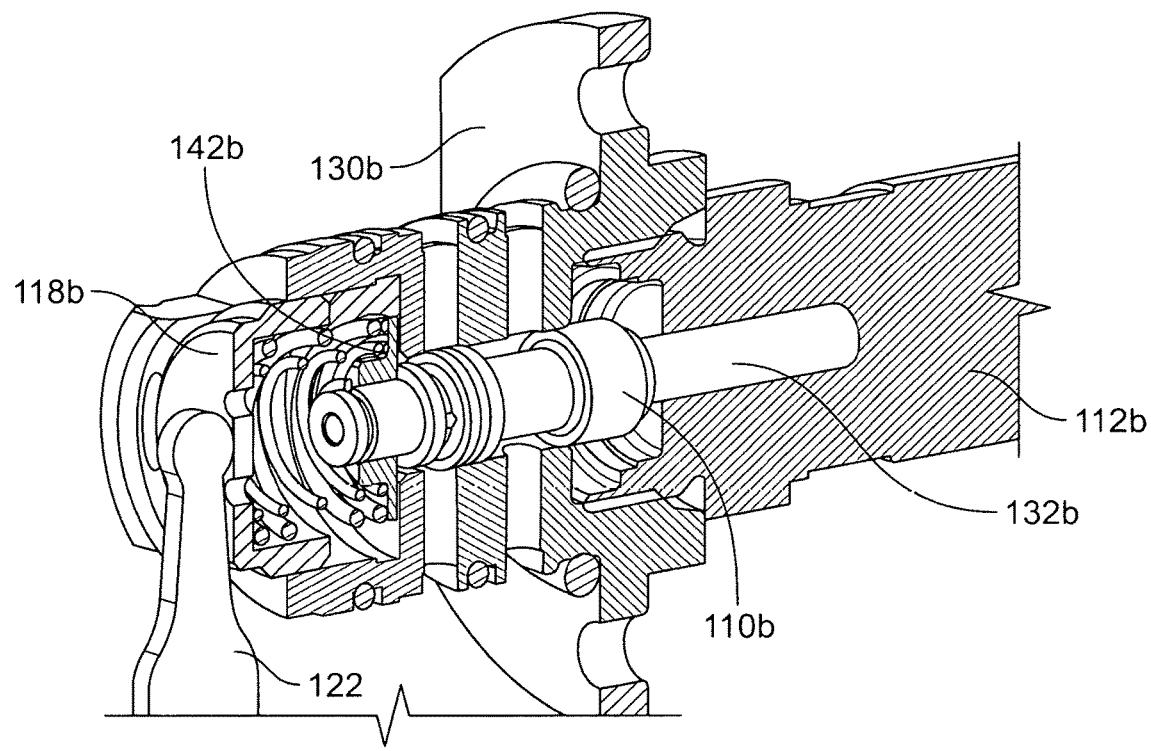
FIG. 12 is a partial axial cross-sectional view of the control module of FIG. 11.
Figure 13:
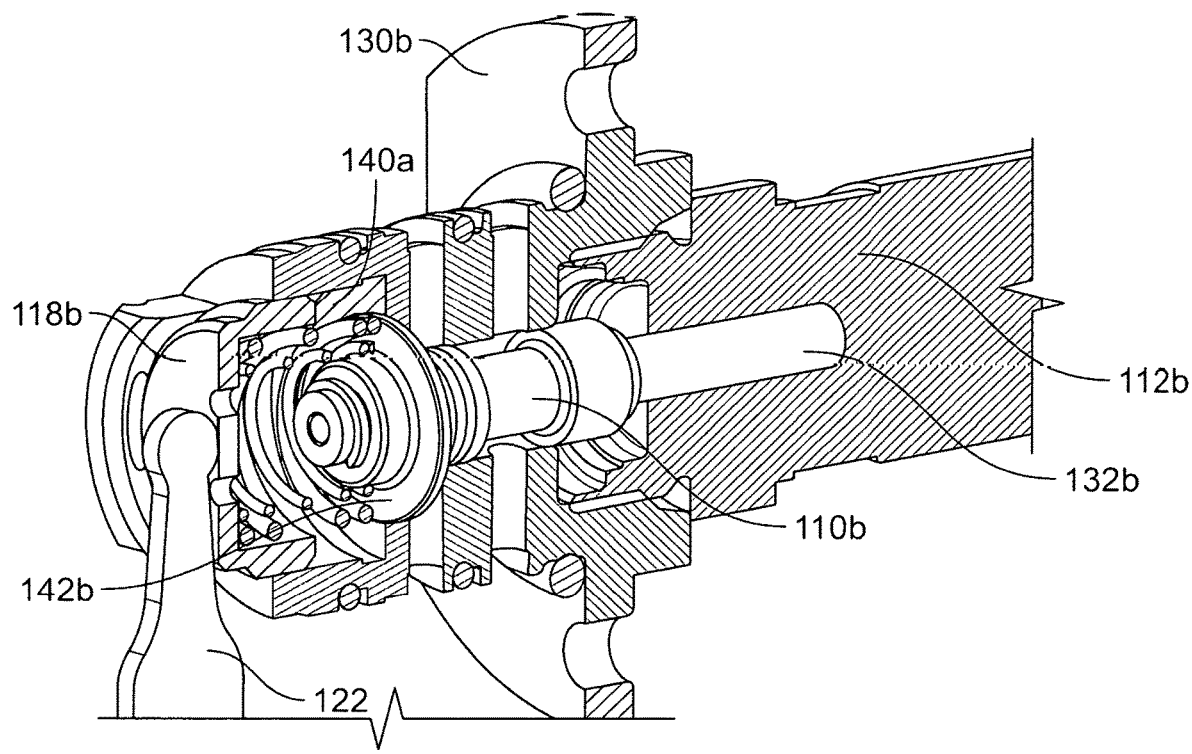
FIG. 13 is a further partial axial cross-sectional view of the control module of FIG. 11.

A flange 155 extends radially from the body 156 of the cage 130a, 130b. The flange 155 includes rounded sides 159 that alternate with flats 157 which together provide a structure that complements a control housing 180 (FIGS. 3-5), the flange 155 abutting an end 182 of the control housing 180 (FIGS. 3-5). The control housing 180 houses both control modules 104 and 106. In addition, cutouts 153 defined the body 156 of the cage 130a, 130b can reduce kinetic friction between the feedback piston 118a, 118b and the interior surface of the feedback piston cavity 150 as the feedback piston 118a, 118b, axially slides within the feedback piston cavity 150. FIG. 5 shows an example mounting configuration with bolts 183 between the cages 130a, 130b and the control housing 180. The housing 180 defines an open pivot space 186 in which the feedback arm 122 can pivot. A shaft 188 received through the housing 180 provides a pivot point for the feedback arm 122.

Figure 14:
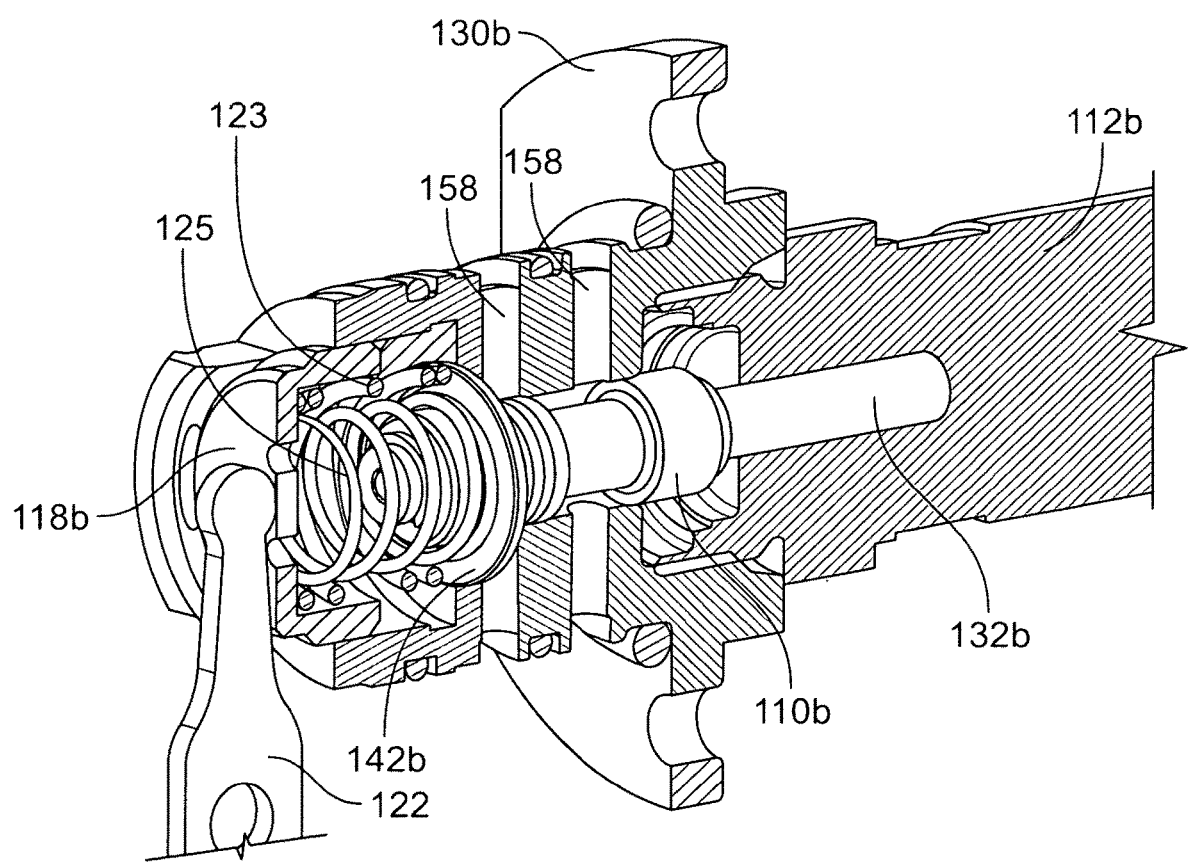
FIG. 14 is a further partial axial cross-sectional view of the control module of FIG. 11.
Figure 15:
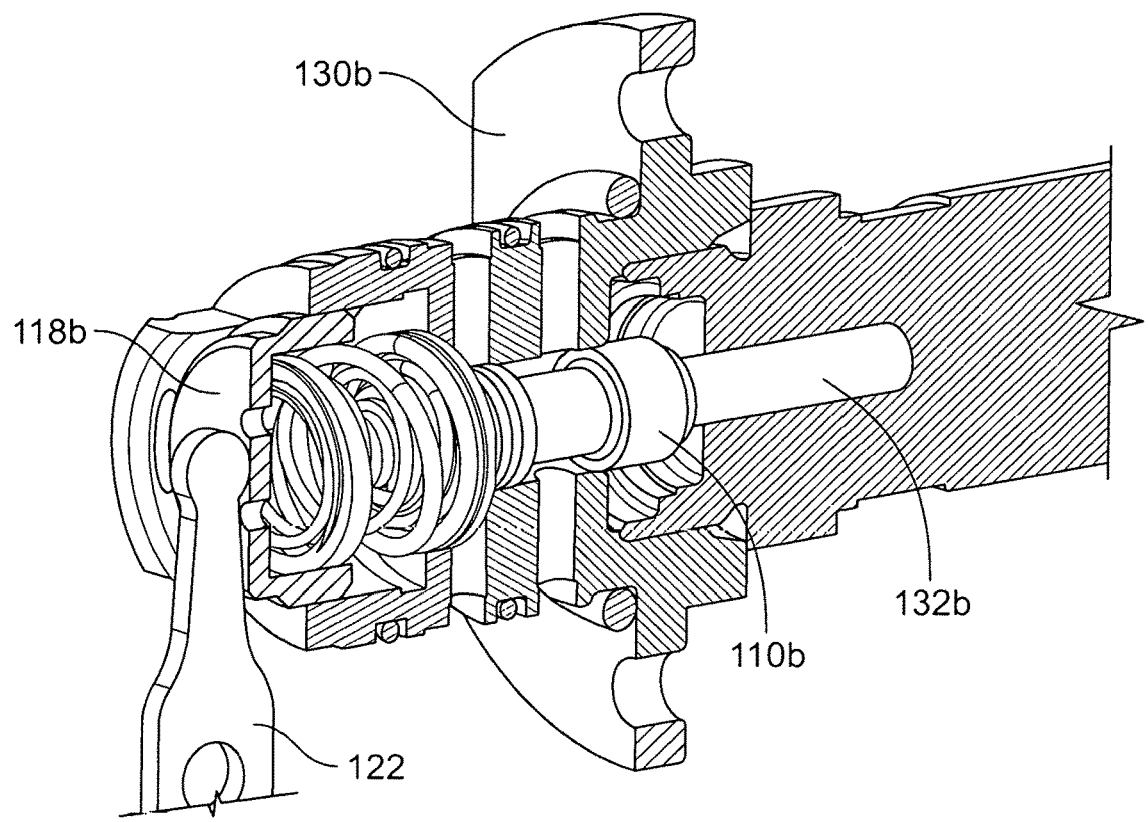
FIG. 15 is a further partial axial cross-sectional view of the control module of FIG. 11.
Figure 16:
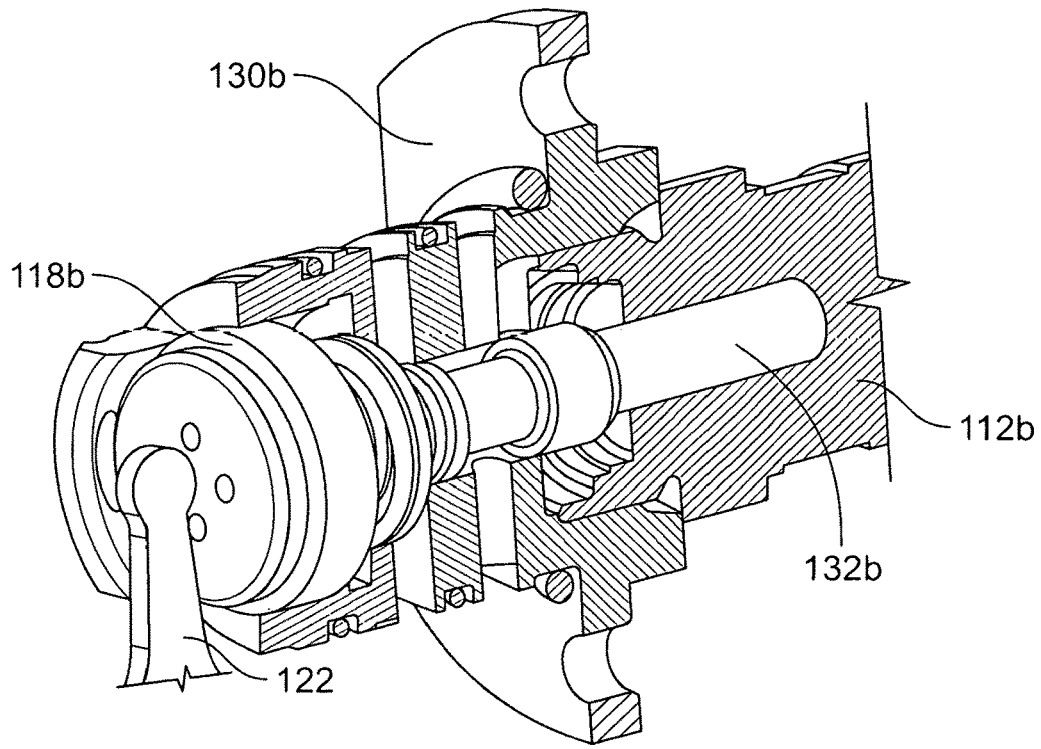
FIG. 16 is a further axial partial cross-sectional view of the control module of FIG. 11.
Figure 17:
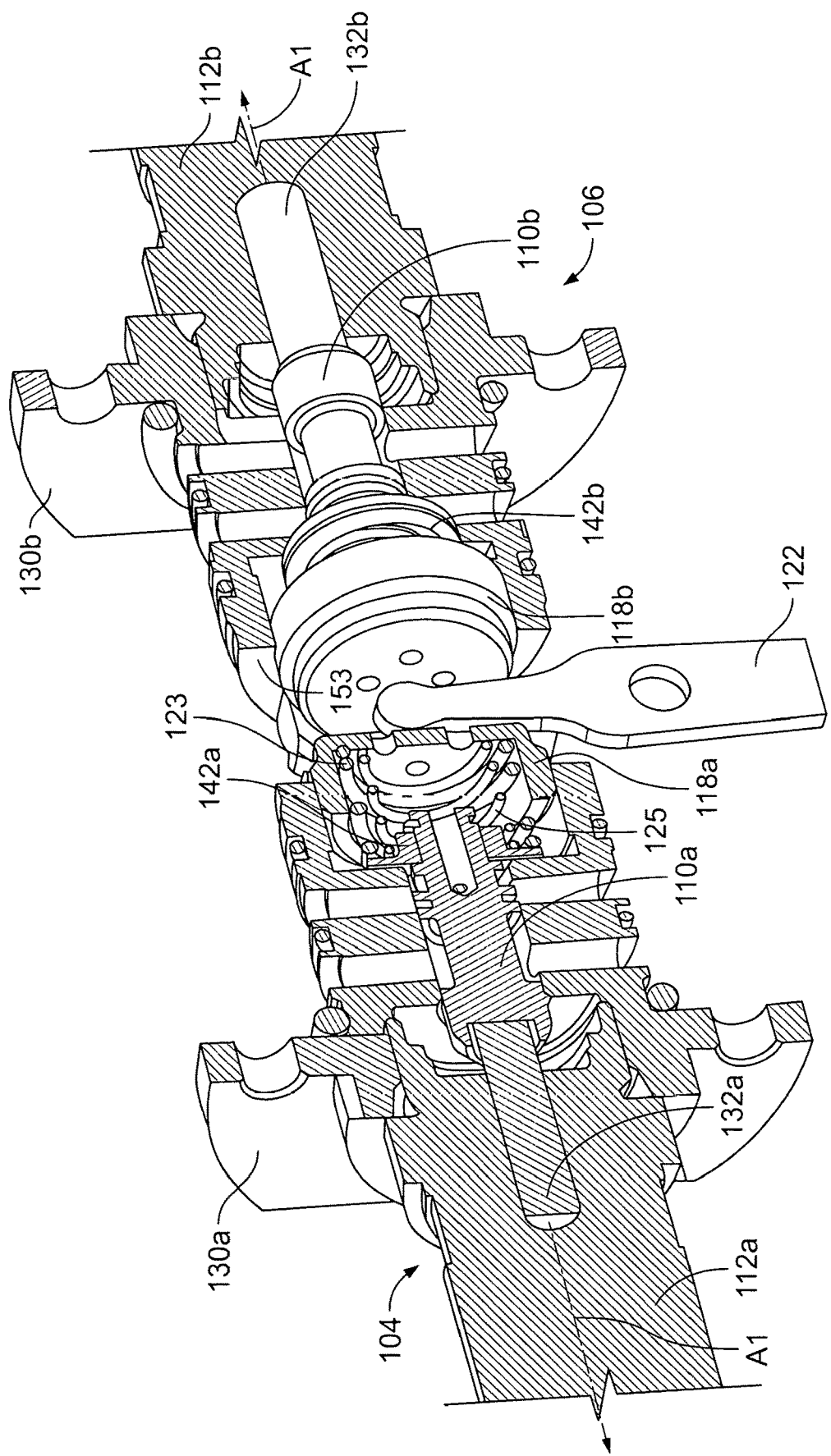
FIG. 17 is a partial cross-sectional view of a portion of the control system of FIG. 1.

Optionally, as shown in FIGS. 14 and 17, the feedback spring 120a, 120b, includes an inner coil spring 123 and an outer coil spring 125 both compressible in the axial direction, the inner coil spring 123 being positioned within and coaxially with the outer coil spring 125. Providing inner and outer springs in this manner can, e.g., provide for part redundancy whereby if one of the springs fails the feedback mechanism still can be operational through the other spring.

Referring to FIG. 3, optionally the body 156 of the cage 130a, 130b includes a receiver 162 (such as a hole or a groove) that receives an axial stopper 160. In some examples, the axial stopper 160 includes one or more pins positioned in each of the cages 130a, 130b and adapted to physically engage the corresponding feedback piston 118a, 118b in its neutral position and thereby prevent the return force of the corresponding feedback spring 120a, 120b from axially pushing beyond the neutral position the feedback piston 118a, 118b, after it returns to the neutral position. The axial stopper 160 can ensure there is sufficient preload force available from the feedback spring 120a, 120b to maintain the spool 110a, 110b in the neutral position.

Figure 18:
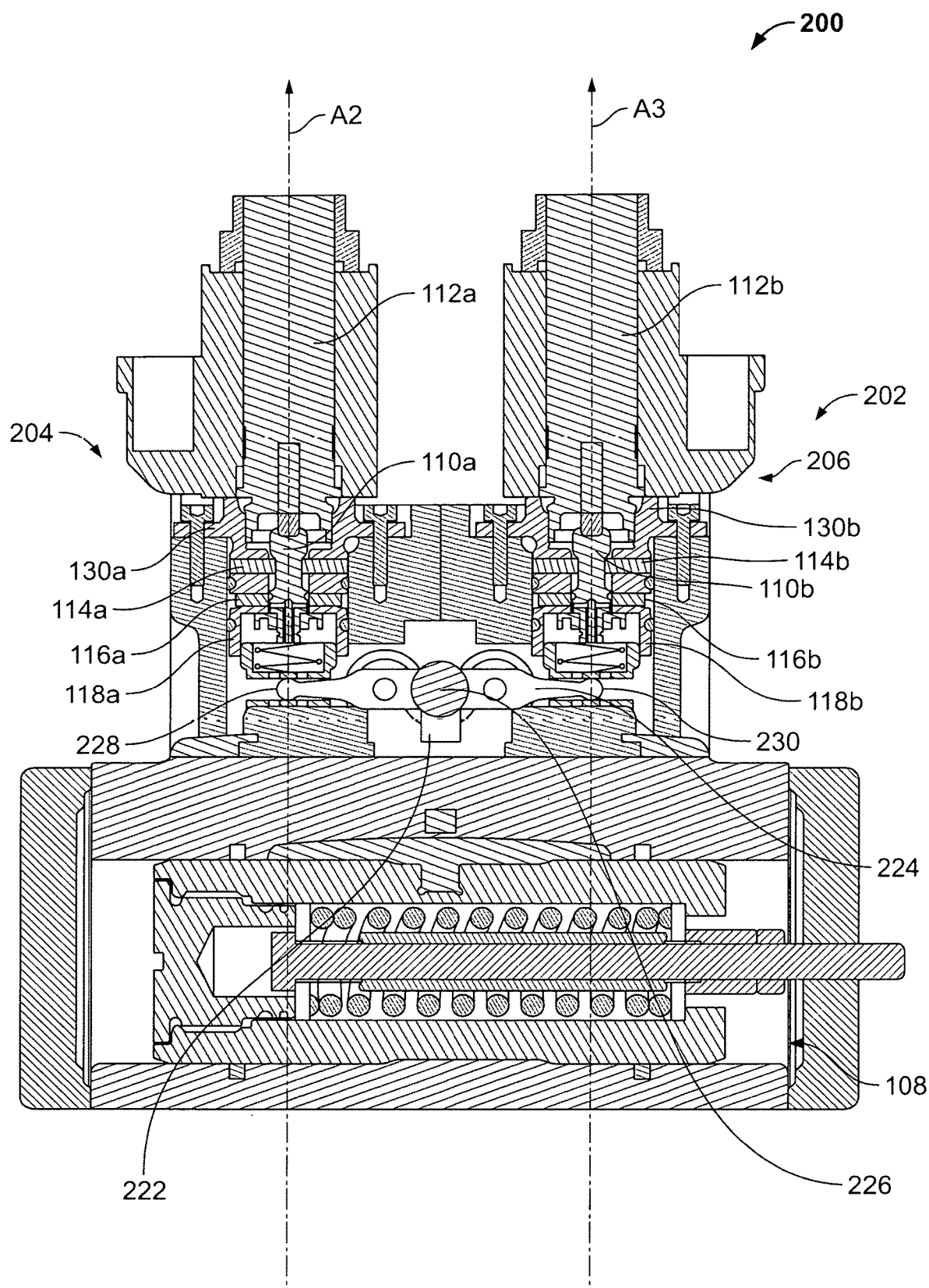
FIG. 18 is a cross-sectional view of a further example control system coupled to a servo-piston of an example axial displacement machine in accordance with the present disclosure.

Referring now to FIG. 18, a hydraulic axial displacement machine 200 having a control system 202 are similar to the machine 100 and control system 102 described above. The following description focuses on differences between the control system 202 and the control system 102 described above.

The control system 202 includes two control modules 204 and 206 of identical construction. The first control module 204 controls forward motion of a servo-piston 108. The second control module 206 controls reverse motion of the servo-piston 108. Unlike the control modules 104 and 106 described above which are axially aligned along the central axis A1, the control modules 204 and 206 are not axially aligned, but rather operate on axes A2 and A3 that are parallel to each other. That is, the spools, solenoids and feedback pistons of the control modules 204 and 206 operate along parallel but not coincident axes. In addition, each of the feedback pistons 118a, 118b is coupled to an opposite end 228, 230 of a secondary lever arm 224 of a compound feedback arm that includes the secondary lever arm 224 pivotally coupled to a primary lever arm 222. The primary lever arm 222 is pivotally coupled to the servo-piston 108 and, like the feedback arm 122 described above, provides feedback information relating to the position of the swashplate. The parallel configuration of the control modules 204, 206 can, e.g., provide improved motion isolation between the feedback mechanism associated with forward motion and the feedback mechanism associated with reverse motion.

Figure 19:
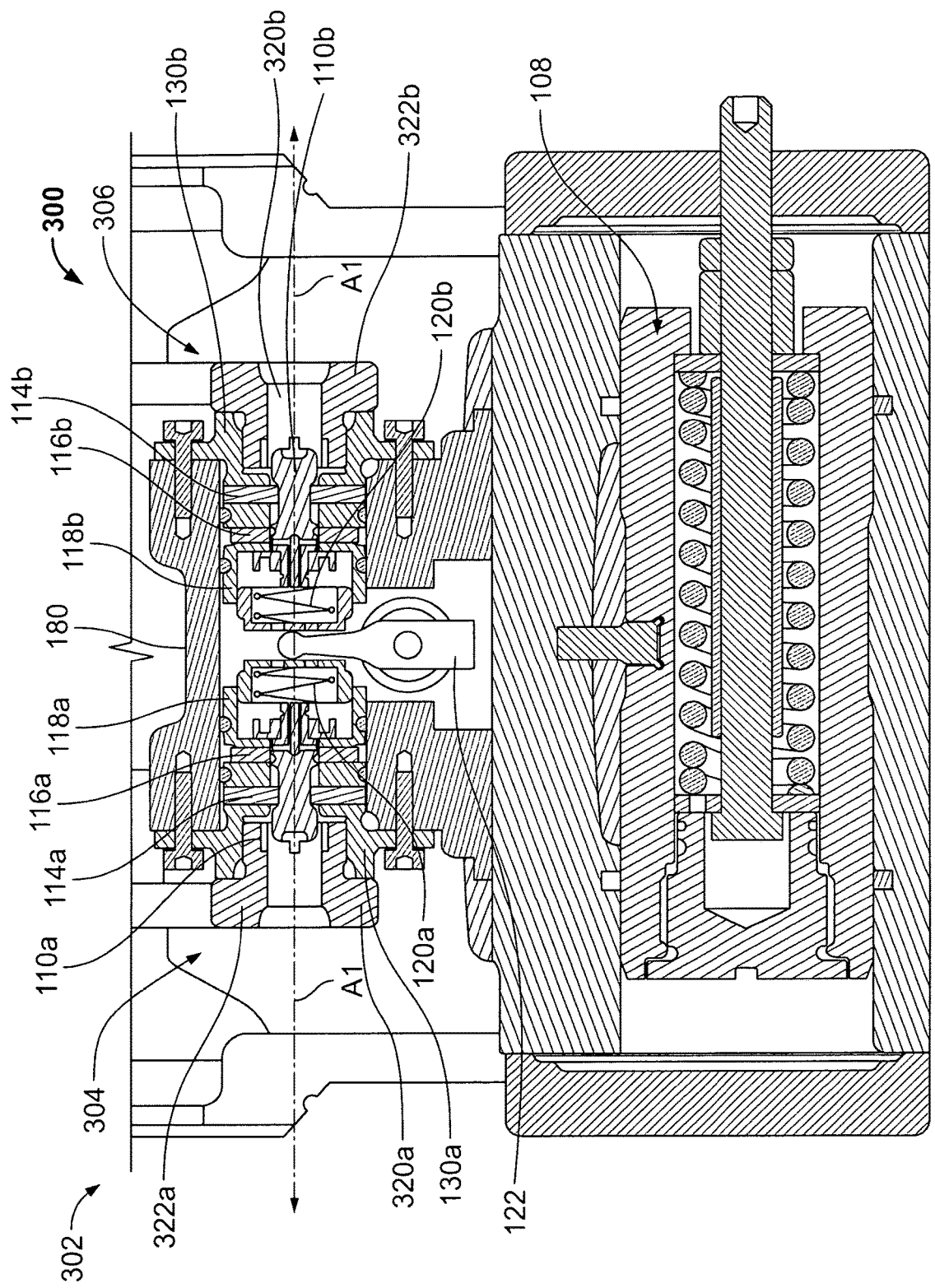
FIG. 19 is a cross-sectional view of a further example control system coupled to a servo-piston of an example axial displacement machine in accordance with the present disclosure.
Figure 20:
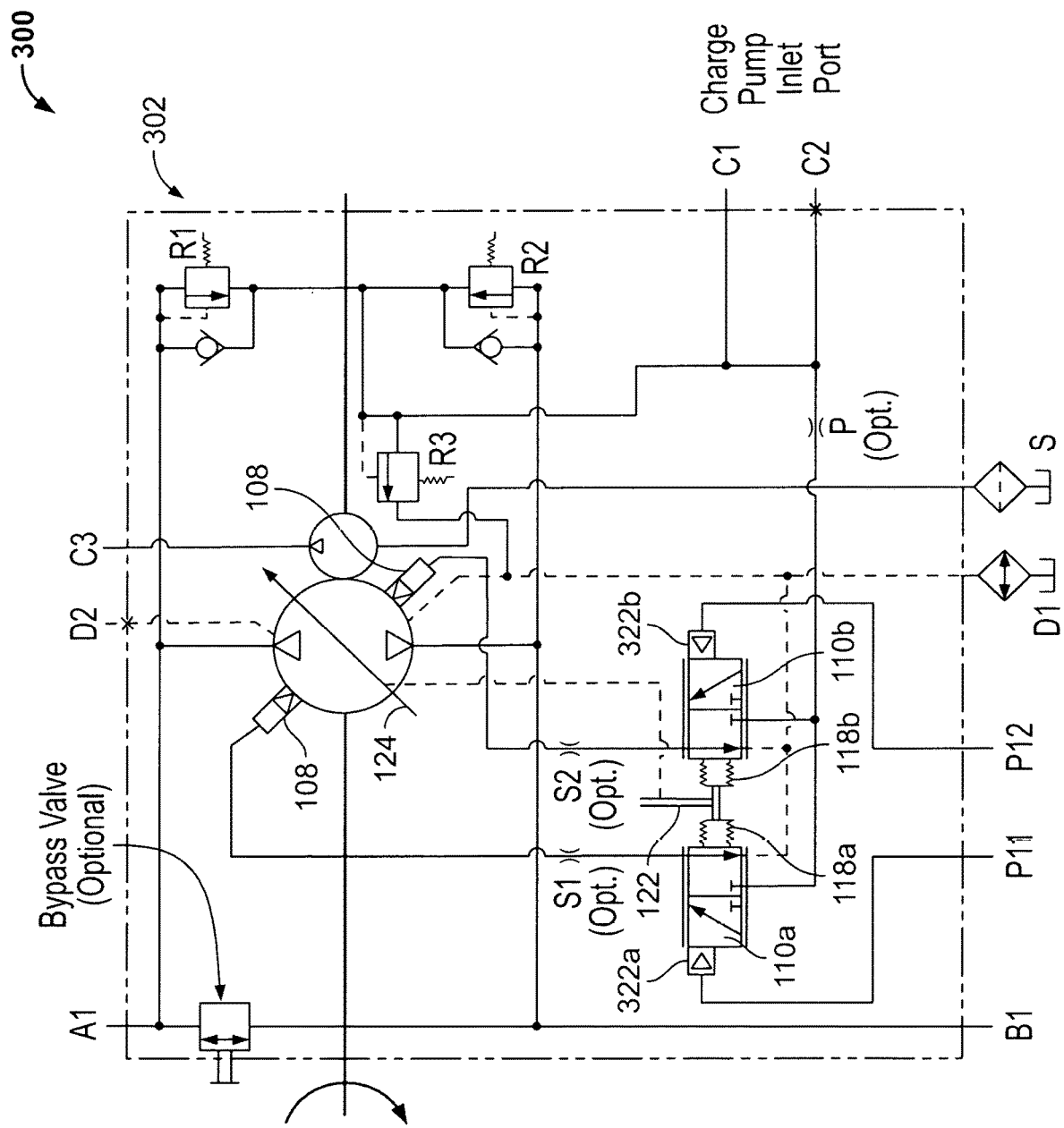
FIG. 20 is a schematic control diagram of the axial displacement machine of FIG. 19.

Referring now to FIGS. 19-20, a hydraulic axial displacement machine 300 with control system 302 are similar to the hydraulic axial displacement machine 100 and control system 102 described above. The following description focuses on differences between the control system 302 and the control system 102 described above.

The control system 302 includes two control modules 304 and 306 of identical construction. The first control module 304 controls forward motion of a servo-piston 108. The second control module 306 controls reverse motion of the servo-piston 108. In the control system 302, the spool actuator for actuating the spools 110a, 110b to move axially along the central axis A1 in each of the modules 304, 306 is a pilot pressure line 320a, 320b, instead of the solenoids 112a, 112b described above. That is, in the control modules 304, 306 the spools 110a, 110b are hydraulically actuated rather than electrically actuated. In particular, the spools 110a and 110b in the control modules 304 and 306 are actuated by pilot pressure fed to the spools by the pilot pressure lines 320a, 320b. Plugs 322a, 322b accommodate the corresponding pilot pressure lines 320a, 320b and are fitted in the cages 130a, 130b to provide a fitting between cages 130a, 130b and the pilot pressure lines 320a, 320b. Thus, it should be appreciated that the structure of the cages 130a, 130b can accommodate both solenoids and pilot pressure lines for actuating the spools 110a, 110b.

Pressure increases or decreases in the pilot pressure lines 320a, 320b in response to a drive command signal and/or in response to a change in the drive command signal, result in an axial force on the corresponding spool 110a, 110b in opposition to the return force of the corresponding feedback spring 120a, 120b of the corresponding feedback piston 118a 118b, opening a communication between the corresponding pressure input line 114a, 114b and the servo-piston charge line 116a, 116b. As described above in connection with the control system 102, the charging pressure causes the servo-piston 108 to move in one direction (right or left corresponding to forward and reverse motion of the machine 300) and the feedback arm 122 to pivot such that the feedback piston 118a, 118b corresponding to the hydraulically actuated spool 110a, 110b shifts in the opposite direction (left or right) against the spring force provided by the spring 122 of that feedback piston. The desired angle of the swashplate 124 (FIG. 20) is achieved when the force applied to the spool 110a, 110b by the corresponding pilot pressure balances the force applied to the spool by the corresponding feedback spring 122a, 122b of the corresponding feedback piston 118a, 118b.

Figure 21:
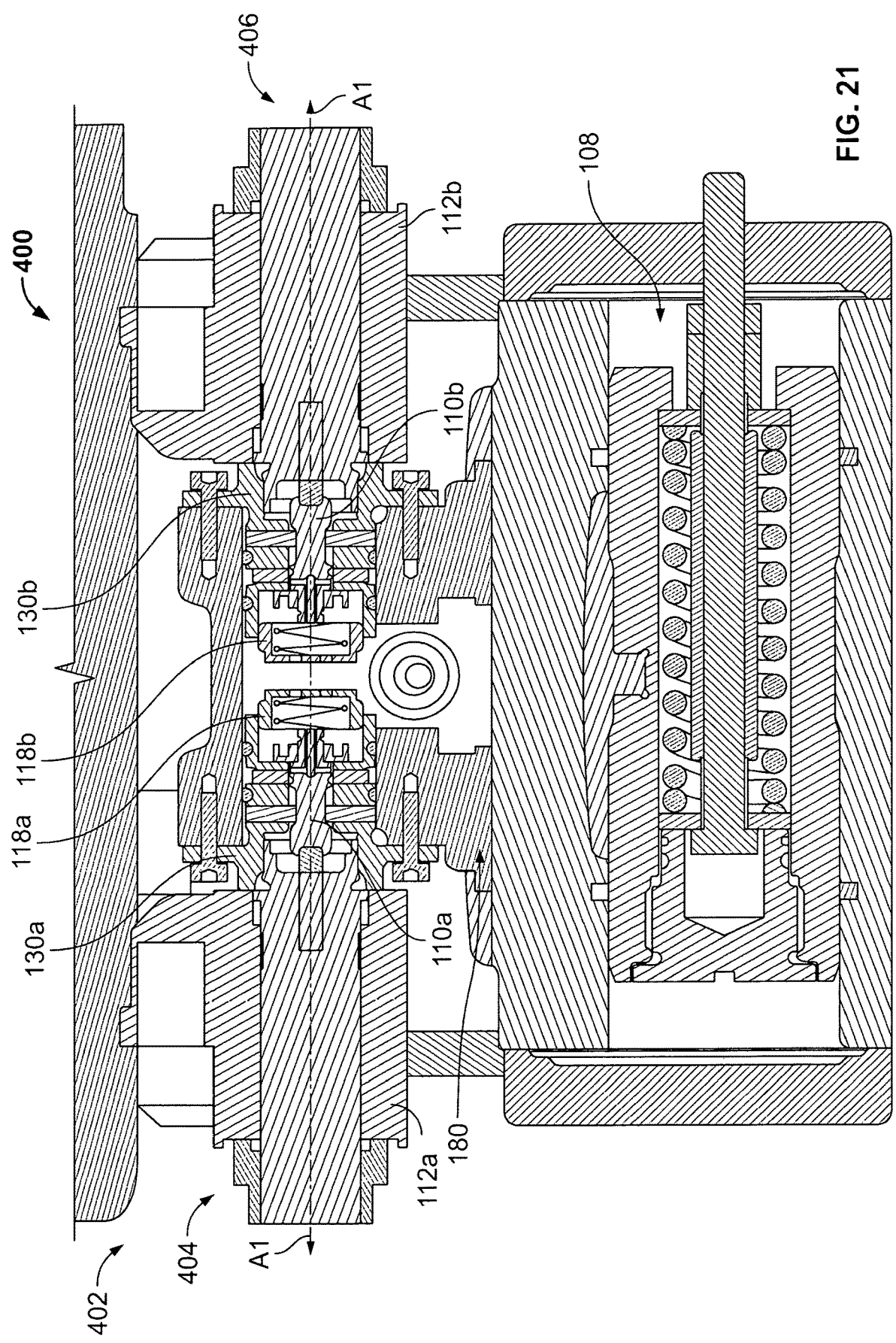
FIG. 21 is a cross-sectional view of a further example control system coupled to a servo-piston of an example axial displacement machine in accordance with the present disclosure.
Figure 22:
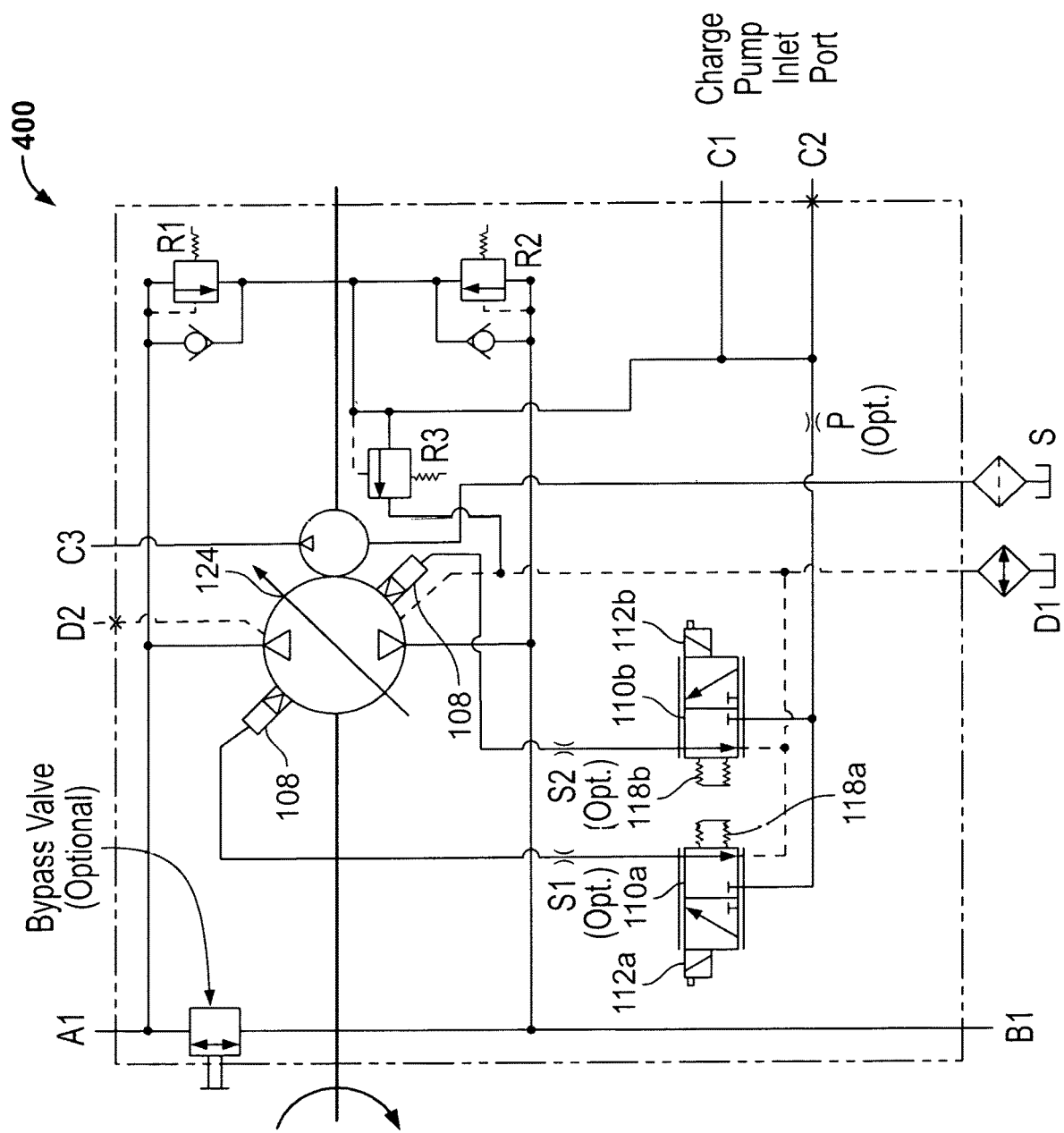
FIG. 22 is a schematic control diagram of the axial displacement machine of FIG. 21.

Referring now to FIGS. 21-22, a hydraulic axial displacement machine 400 with a control system 402 are similar to the hydraulic axial displacement machine 100 and control system 102 described above. The following description focuses on differences between the control system 402 and the control system 102.

The control system 402 includes two control modules 404 and 406 of identical construction. The first control module 404 controls forward motion of a servo-piston 108. The second control module 406 controls reverse motion of the servo-piston 108. In the control system 302, unlike the control system 102, there is no feedback assembly. In particular, as shown in FIGS. 20 and 21, there is no feedback arm linking the swashplate 124 to the feedback pistons 118a, 118b. Thus, the control system 402 does not provide feedback information proportional to an angle of the swashplate 124 relative to the swashplate's neutral position. Nevertheless, the control system 402 is configured to operate in three modes—forwards, reverse and neutral, using the pair of control modules 404 and 406. Each of the control modules 404, 406 includes a spool actuator (e.g., a solenoid 112a, 112b), a spool 110a, 110b, and a spring 122a, 122b that cooperates with the spool 110a, 110b to return the spool 110a, 110b to the neutral position when the corresponding actuator 112a, 112b is deactivated. In this embodiment, the feedback pistons 118a, 118b can thereby function as a spring seat for one end of the corresponding spring 120a, 120b, and the corresponding spool-spring coupler 142a, 142b (FIG. 17) can function as a spring seat for the axially opposing end of the spring 122a, 122b. Performance of the machine 400 can be improved due to the return force applied by the pistons 118a, 118b on the spools 110a, 110b after the actuators 112a, 112b are deactivated.

Figure 23:
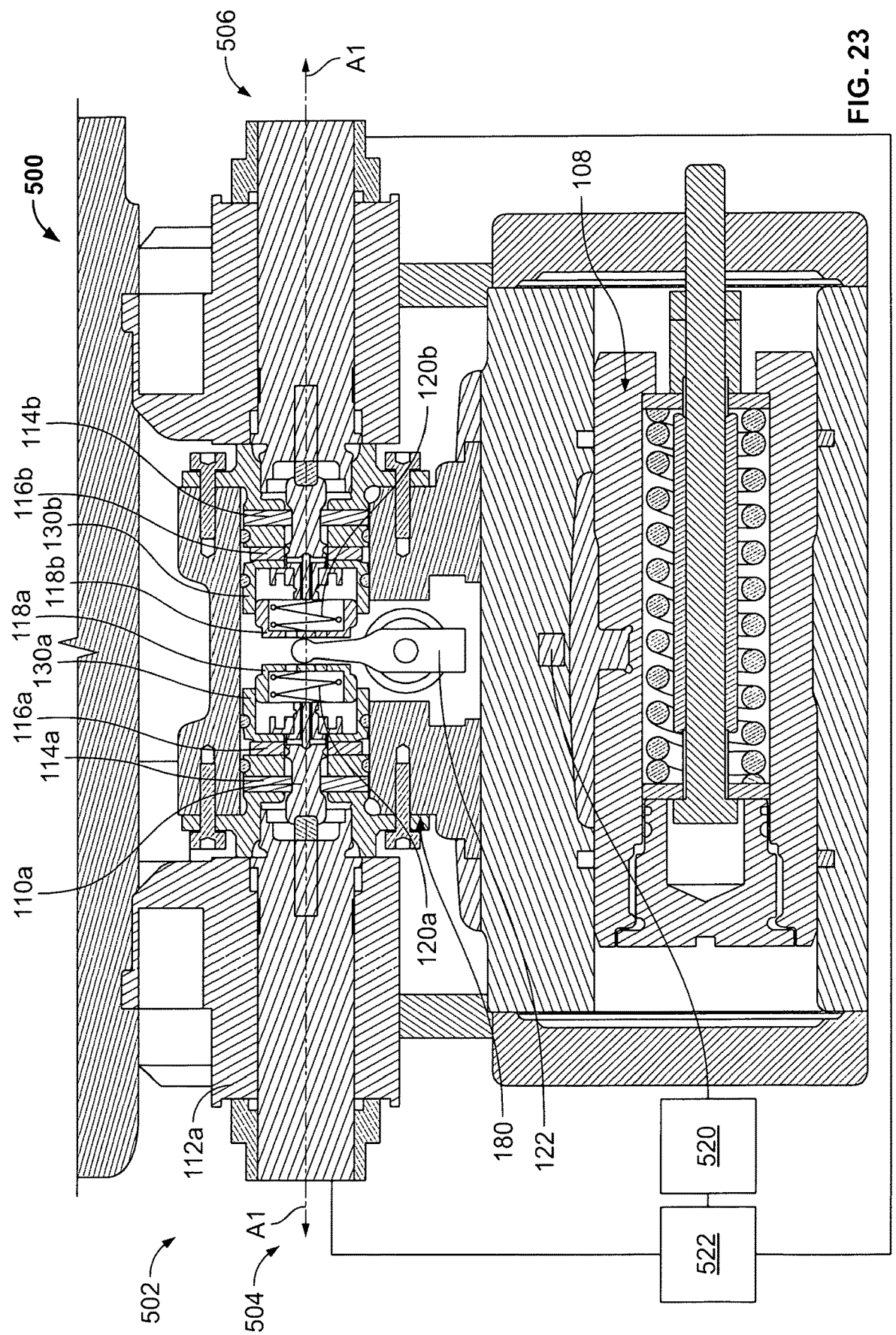
FIG. 23 is a cross-sectional view of a further example control system coupled to a servo-piston of an example axial displacement machine in accordance with the present disclosure.

Referring now to FIGS. 23-25, a hydraulic axial displacement machine 500 with a control system 502 are similar to the hydraulic axial displacement machine 100 and control system 102 described above. The following description focuses on differences between the control system 502 and the control system 102.

In particular, the system 502 includes a feedback arm angle sensor 520, which is illustrated schematically in FIG. 23, and is illustrated in FIGS. 24-25, optionally, as a component coupled to an exterior surface of control housing 180. The feedback arm angle sensor 520 is adapted to detect pivoting of the feedback arm and provide signals corresponding to the pivot angle to a controller 522. The controller 522 is configured to compare the feedback pivot angle with the electrical drive command signal (or other drive command signal, e.g., an hydraulic drive command signal) for driving the servo-piston 108. To the extent there is a discrepancy between the feedback pivot angle and the command signal, the controller 522 is adapted to provide an error correction signal to the appropriate solenoid or other spool actuator 112a, 112b to compensate for the discrepancy and thereby achieve the desired angle of the swashplate 124 (FIG. 2). The controller is thus operatively coupled to the solenoids 112a, 112b and is thereby adapted to send control signals to the solenoids 112a, 112b. It should be appreciated that the sensor 520 and the controller 522 can be integrated into any of the embodiments of a control system described herein that include a feedback arm.

In some examples the controller 522 includes, or is operatively coupled to, a processor that executes computer readable instructions stored on a memory, where the execution of the computer-readable instructions causes the controller 522 to provide the control signals needed to correct a discrepancy between a desired and an actual angle of the swashplate and to provide no correction signal when there is no discrepancy or less than a predetermined maximum threshold discrepancy.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A control system for a hydraulic axial displacement machine, comprising:
a spool, a spool actuator, a pivotal feedback arm, a spring, and a feedback piston, the spool being coupled to the spring and adapted to move axially with the feedback piston between a charging position and a neutral position, the feedback arm being adapted to pivot proportionally to an angular position of a swashplate when the feedback arm is pivotally coupled to a servo-piston, the feedback arm being coupled to the feedback piston such that pivoting of the feedback arm activates the feedback piston and generates a spring compression force that compresses the spring between the spool and the feedback piston such that the spring is compressed by the spool and the feedback piston.

2. The control system of claim 1, wherein when a drive command signal is transmitted to the spool, the spool is adapted to respond to the drive command signal by moving axially to the charging position in which a pressure input line is in fluid communication with a servo-piston charge line.

3. The control system of claim 1, wherein the spool actuator is adapted to move the spool to the charging position.

4. The control system of claim 3, wherein the spool actuator includes a solenoid adapted to receive electrical drive command signals.

5. The control system of claim 3, wherein a drive command signal is transmitted to the spool in the form of a pressure increase in a pilot pressure line that axially moves the spool to the charging position.

6. The control system of claim 1, further comprising an axial movement stopper that engages the feedback piston in the neutral position and prevents the feedback piston from moving beyond the neutral position under a return force of the spring towards the neutral position.

7. The control system of claim 6, wherein the axial movement stopper comprises a pin.

8. The control system of claim 1, further comprising a spool-spring coupler adapted to abut the spring on a first side of the spool-spring coupler and the spool on a second side of the spool-spring coupler.

9. The control system of claim 1, further comprising a cage adapted to at least partially house the spool, the spring, the feedback piston, and the spool actuator.

10. The control system of 9, wherein the cage defines a feedback piston cavity that at least partially receives the feedback piston and the spring; a spool cavity that at least partially receives the spool; and an actuator volume for receiving at least a portion of the solenoid or a pilot pressure line plug.

11. The control system of claim 10, wherein the feedback piston cavity, the spool cavity and the actuator volume are in communication with one another such that the spring, the spool-spring coupler, the spool, and the spool actuator operably cooperate with one another.

12. A control system for a hydraulic axial displacement machine, comprising:
   a feedback arm adapted to pivot proportionally to an angular position of a swashplate when the feedback arm is pivotally coupled to a servo-piston;
   a forward motion control module; and
   a reverse motion control module, each of the forward and reverse motion control modules comprising a spool movable between a charging position and a neutral position, a spool actuator, a spring, and a feedback piston, the spring being coupled to the spool and the feedback piston, the feedback piston being coupled to the feedback arm such that pivoting of the feedback arm in a first direction activates the feedback piston of the forward motion module and generates a spring compression force between the spool and the feedback piston of the forward motion control module, and such that pivoting of the feedback arm in a second direction activates the feedback piston of the reverse motion module and generates a spring compression force between the spool and the feedback piston of the reverse motion control module.

13. The control system of claim 12, wherein the feedback piston of the forward motion module and the feedback piston of the reverse motion module are axially aligned.

14. The control system of claim 12, wherein the feedback piston of the forward motion module and the feedback piston of the reverse motion module are axially parallel but not axially aligned.

15. The control system of claim 14, wherein the feedback arm is a compound arm including a primary arm adapted to be pivotally coupled to the servo-piston and a secondary arm pivotally coupled to the primary arm and to the feedback pistons.

16. The control system of claim 12, wherein each of the forward motion control module and reverse motion control module comprises a cage adapted to at least partially house the spool, the spring, the feedback piston, and the spool actuator.

17. The control system of 16, wherein each of the cages defines a feedback piston cavity that at least partially receives the feedback piston and the spring; a spool cavity that at least partially receives the spool; and an actuator volume for receiving at least a portion of the spool actuator.

18. The control system of claim 17, wherein the feedback piston cavity, the spool cavity and the actuator volume of each of the cages are in communication with one another such that the spring, the spool-spring coupler, the spool, and the spool actuator operably cooperate with one another in each of the cages.

19. A control system for a hydraulic axial displacement machine, comprising:
   a forward motion module and a reverse motion module, each of the forward and reverse motion modules comprising a spool movable between a charging position and a neutral position, a spool actuator, a feedback piston, and a spring, the spring being received in the feedback piston and coupled to the spool such that axial movement of the spool in a first direction towards the charging position generates a compression force in the spring that biases the spool towards the neutral position, and such that axial movement of the feedback piston in a second direction that is opposite the first direction generates a compression force in the spring that biases the feedback piston towards the first direction.

20. The control system of claim 19, wherein each of the modules further comprises a spool-spring coupler adapted to abut the spring on a first side of the spool-spring coupler and to abut the spool on a second side of the spool-spring coupler.

21. The control system of claim 19, wherein each of the modules further comprises a cage adapted to at least partially house the spool, the spring, and the spool actuator.

22. The control system of claim 21, wherein each of the cages defines a first cavity that at least partially receives the spring; a spool cavity that at least partially receives the spool; and an actuator volume for receiving at least a portion of the spool actuator.

23. The control system of claim 22, wherein, for each cage, the spool cavity and the actuator volume are in communication with one another such that the spring, the spool-spring coupler, the spool, and spool actuator operably cooperate with one another.

24. A control system for a hydraulic axial displacement machine, comprising:
   a spool;
   a spool actuator;
   a pivotal feedback arm;
   a spring;
   a feedback piston, the feedback arm being coupled to the feedback piston, the spool being coupled to the spring and adapted to move axially with the feedback piston between a charging position and a neutral position, the feedback arm being adapted to be pivotally coupled to a servo-piston and further adapted to pivot proportionally to an angular position of a swashplate when the feedback arm is pivotally coupled to the servo-piston, the spring being adapted to bias the spool towards the neutral position of the spool;
   a controller; and
   an angle sensor adapted to detect an amount of pivoting of the feedback arm away from a position corresponding to a neutral position of the swashplate when the feedback arm is pivotally coupled to the servo-piston, such that a detected amount of pivot of the feedback arm is transmitted as a feedback signal to the controller, the controller being adapted to compare the detected pivot to a drive command signal,
   wherein the controller is adapted to transmit an error signal to the spool actuator in response to a discrepancy between the drive command signal and the feedback signal, the error signal causing the spool to move axially to compensate for the discrepancy.

* * * * *